US012566661B2

(12) United States Patent
Wang

(10) Patent No.: US 12,566,661 B2
(45) **Date of Patent: *Mar. 3, 2026**

(54) ADAPTIVE LOG DATA LEVEL IN A COMPUTING SYSTEM

(71) Applicant: Juniper Networks, Inc., Sunnyvale, CA (US)

(72) Inventor: Jisheng Wang, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/052,043

(22) Filed: Nov. 2, 2022

(65) Prior Publication Data

US 2023/0140280 A1 May 4, 2023

Related U.S. Application Data

(63) Continuation of application No. 17/200,229, filed on Mar. 12, 2021, now Pat. No. 11,494,255.

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *G06F 11/0751* (2013.01);
(Continued)

(58) Field of Classification Search
CPC ............... G06F 11/079; G06F 11/0793; G06F 11/0778; G06N 20/00
See application file for complete search history.

(56) References Cited

U.S. PATENT DOCUMENTS 10,078,571 B2 * 9/2018 Altman .............. G06F 11/3476
10,922,163 B2   2/2021 Spencer et al.
(Continued)

FOREIGN PATENT DOCUMENTS

CN    109299045 A    2/2019

OTHER PUBLICATIONS

Response to Communication pursuant to Rule 69 dated Sep. 19, 2022, from counterpart European Application No. 22150413.7 filed Mar. 13, 2023, 32 pp.
Extended Search Report from counterpart European Application No. 22150413.7 dated Jun. 9, 2022, 10 pp.
(Continued)

*Primary Examiner* — Jonathan D Gibson
(74) *Attorney, Agent, or Firm* — Shumaker & Sieffert, P.A.

(57) ABSTRACT

Disclosed are embodiments for improving remote diagnostics of a computer system. Some embodiments obtain operational parameter values and log data from a plurality of network devices, and provide the operational parameter values and log data to a machine learning model. The model is trained to identify a root cause of a degradation of the computer system based on the operational parameter values and log data, and to provide recommendations of log data level settings for the network devices. If the model identifies a root cause of the degradation with sufficient confidence, a remedial action is identified and applied to the computer system. If the confidence level is insufficient, log data level settings of the network devices are modified based on the recommendations of the model. This process may be performed iteratively until a root cause is identified with sufficient confidence.

18 Claims, 14 Drawing Sheets

(51) Int. Cl.

| | |
|---|---|
| *G06N 7/01* | (2023.01) |
| *G06N 20/00* | (2019.01) |
| *H04L 41/0631* | (2022.01) |
| *H04L 41/069* | (2022.01) |
| *H04L 41/149* | (2022.01) |
| *H04L 41/16* | (2022.01) |

(52) U.S. Cl.
CPC ........ *G06F 11/0778* (2013.01); *G06F 11/079* (2013.01); *G06N 7/01* (2023.01); *G06N 20/00* (2019.01); *H04L 41/0631* (2013.01); *H04L 41/069* (2013.01); *H04L 41/149* (2022.05); *H04L 41/16* (2013.01)

(56) References Cited

U.S. PATENT DOCUMENTS

| | | | |
|---|---|---|---|
| 11,175,975 B1 | 11/2021 | Wilson | |
| 2012/0215907 A1* | 8/2012 | Chung | G06F 21/554 709/224 |
| 2015/0089309 A1 | 3/2015 | Fu et al. | |
| 2016/0292592 A1 | 10/2016 | Patthak et al. | |
| 2017/0161130 A1* | 6/2017 | Goldstein | G06Q 50/04 |
| 2017/0168914 A1* | 6/2017 | Altman | G06F 11/079 |
| 2018/0307551 A1* | 10/2018 | Bacha | G06F 11/079 |
| 2019/0095313 A1* | 3/2019 | Xu | G06F 18/24323 |
| 2020/0073741 A1 | 3/2020 | Wang et al. | |
| 2020/0151042 A1* | 5/2020 | Spencer | G06F 11/0709 |
| 2020/0382361 A1 | 12/2020 | Chandrasekhar et al. | |
| 2021/0089377 A1 | 3/2021 | Wang et al. | |
| 2021/0157666 A1 | 5/2021 | Spencer et al. | |
| 2022/0091915 A1 | 3/2022 | Perneti et al. | |
| 2022/0171670 A1* | 6/2022 | Srivatsa | G06F 40/186 |
| 2023/0188409 A1* | 6/2023 | Wang | G06F 11/0754 709/224 |
| 2023/0315553 A1* | 10/2023 | Kumar | G06F 11/0787 714/47.3 |

OTHER PUBLICATIONS

Messager et al., "Inferring Functional Connectivity From Time-Series of Events in Large Scale Network Deployments", IEEE Transactions on Network and Service Management, vol. 16, No. 3, IEEE, Sep. 1, 2019, pp. 857-870.

Notice of Allowance from U.S. Appl. No. 17/200,229 dated Aug. 8, 2022, 9 pp.

Supplemental Notice of Allowance from U.S. Appl. No. 17/200,229 dated Aug. 8, 2022, 2 pp.

U.S. Appl. No. 17/200,229, filed Mar. 12, 2021, naming inventors Wang et al.

Zhou et al., "LogSayer: Log Pattern-driven Cloud Component Anomaly Diagnosis with Machine Learning", 2020 IEEE/ACM 28th International Symposium on Quality of Service (IWQoS), IEEE, Jun. 15, 2020, pp. 1-10.

Notice of Intent to Grant and Text Intended to Grant from counterpart European Application No. 22150413.7 dated Nov. 25, 2024, 59 pp.

Notice of Intent to Grant and Text Intended to Grant from counterpart European Application No. 22150413.7 dated May 31, 2024, 57 pp.

Cândido et al., "Log-based software monitoring: a systematic mapping study", PeerJ Computer Science, arXiv: 1912.05878v4, Mar. 5, 2021, 27 pp.

Extended Search Report from counterpart European Application No. 25168858.6 dated Jul. 15, 2025, 24 pp.

Messager et al., "Inferring Functional Connectivity From Time-Series of Events in Large Scale Network Deployments", IEEE Transactions on Network and Service Management, vol. 16, No. 3, IEEE, Sep. 2019, 14 pp.

Zhou et al., "LogSayer: Log Pattern-driven Cloud Component Anomaly Diagnosis with Machine Learning", 2020 IEEE/ACM 28th International Symposium on Quality of Service (IWQoS), IEEE, Jun. 2020, 10 pp.

Response to Extended Search Report dated Jul. 15, 2025, from counterpart European Application No. 25168858.6 filed Jan. 22, 2026, 24 pp.

* cited by examiner

700

800

START ⟍805

SEND A COMMAND TO CHANGE A LOG DATA LEVEL FOR A
SPECIFIC COMPONENT OF A DEVICE ⟍810

RECEIVE A NEW LOGGING DATA RATE PER NEW LOGGING LEVEL ⟍815

MEASURE DATA RATE OF THE LOGGING DATA ⟍820

DETERMINE A MEASURE OF INCOMING LOGGING DATA RATE ⟍825

STORE LOGGING DATA RATE ⟍830

END ⟍850

900

ADAPTIVE LOG DATA LEVEL IN A COMPUTING SYSTEM

CROSS REFERENCE TO RELATED APPLICATIONS

This application is a continuation of U.S. application Ser. No. 17/200,229, filed Mar. 12, 2021, which is incorporated by reference herein in its entirety.

TECHNICAL FIELD

This application is generally directed to the use of machine learning, statistical analysis, and information theory to manage information collected from a computer system.

BACKGROUND

As the computer industry continues to mature, solutions are sold, in part, based on a cost of maintenance. With the emergence of pervasive digital connectivity, the ability to support and manage a product remotely from a centralized location has become possible. By centralizing support and management, a center of competence can be maintained that would not be possible under a distributed product support model. The specialization skills provided by the center of competence, leveraged across a large installed base of products, functions to both increase effectiveness of support and also reduce costs. However, challenges with remote support and management of installed products remain. Thus, improved methods of remote management and support are needed.

BRIEF DESCRIPTION OF THE DRAWINGS

The present disclosure is illustrated by way of example and not limitation in the FIGS. of the accompanying drawings, in which like references indicate similar elements and in which.

DETAILED DESCRIPTION

Figure 1:
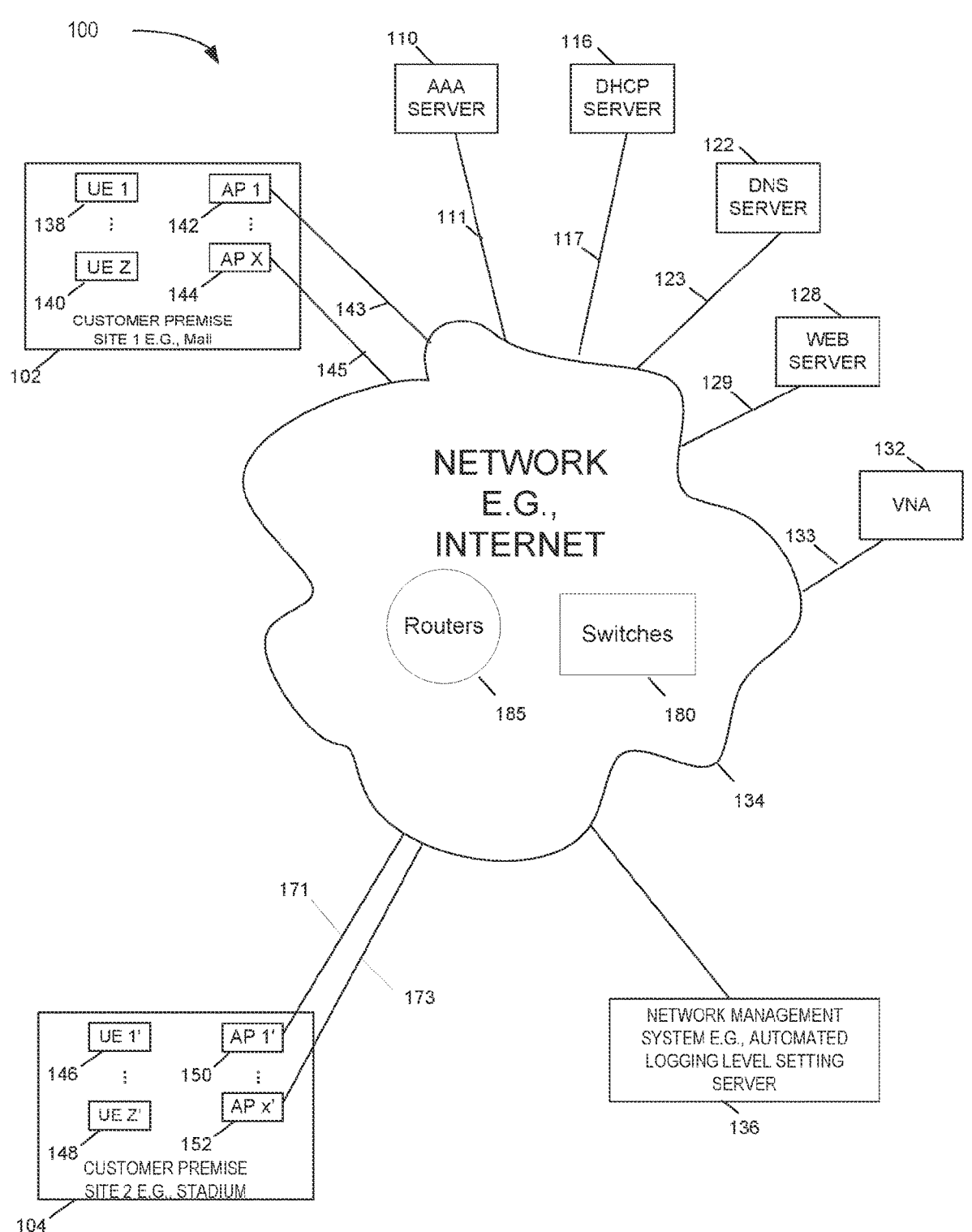
FIG. 1 is an overview diagram of an example system implementing one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Many computer systems collect information to facilitate the diagnosis of various anomalies that may arise during operation. Recently, solutions that employ artificial intelligence (AI), such as machine learning models to diagnose the operation of a computer system have been developed. These AI based solutions ingest a relatively large amount of data in order to diagnose a problem and in some cases, identify a root cause.

A trend towards larger data sets is further exacerbated by a growing success of network monitoring as a service (MaaS) product offerings. When providing network monitoring as a service, network related information is collected from customer sites. This network information is collected, in some cases, from one or more of end-user devices, such as smart phones, laptops, desktop computers, printers, and other devices, network components, such as access points, switches, routers, or other network components, or customer site based server computers, such as mail servers or file servers.

Data from these devices is analyzed using various analysis tools (some of which are AI based), to identify degradations in operation. Some embodiments measure a service level experience (SLE) and compare the measured SLE to predefined metrics to establish whether a computer system attached to the network or any network component is operating nominally or not. In some cases, appropriate actions can be identified to mitigate the anomalous operation and in some cases, return the system to nominal operation without human intervention.

As a monitored system becomes more complex, an amount of data collected and analyzed to identify these root causes and provide corrective actions increases exponentially. Increasing data sizes present not only network bandwidth and throughput challenges, but also data storage and computing power challenges. In some cases, a machine learning model examines data generated during a relatively protracted time period in order to properly identify anomalous behavior and, in some cases, identify a root cause and possibly invoke corrective actions. Storing data during this protracted time period has the potential to consume vast amount of storage, even in an era where stable storage is relatively plentiful and inexpensive.

Embodiments disclosed provide for autonomous control of a level of logging activity for a plurality of computing components. The log data level is set so as to both provide sufficient data to diagnose operation of a computer system and in some circumstances, identification of remedial actions. The log data level is also set to minimize impact on the system created by the logging activity.

Some embodiments identify a first portion of a first network system that is experiencing anomalous operation (e.g., experiencing a degradation in SLE). Another second portion of a second network system (the first and second network systems can be equivalent in some embodiments or different), is identified that is operating nominally. Some embodiments then compare logging data of the first portion and the second portion. In some embodiments, log data levels between the two systems are adjusted so as to produce analogous log data streams (e.g. log data levels of analogous components are set to equivalent values). In some cases, comparisons of the analogous log data streams are performed in order to isolate a cause of the anomalous operation of the first network system.

In some embodiments, a rate of data collection is governed by a predetermined threshold. The rate and/or a total amount of data collected is monitored and if the monitored information exceeds a respective predetermined threshold, some of the disclosed embodiments automatically reduce log data levels of one or more components to bring the rate and/or total amounts back within predefined ranges and/or below predefined thresholds.

Some embodiments implement a machine learning model system to provide identification of a cause of a degradation to a computer system. The machine learning model system also provides a probability associated with the cause. The probability indicates a likelihood that the identified cause is actually causing the degradation. The machine learning model also provides recommendations with respect to log data level settings for one or more devices and/or components of those devices. In some of these embodiments, if the probabilities associated with causes identified by the machine learning model system are below a predefined threshold, log data level settings of one or more components and/or devices of the computer system are modified in accordance with the recommendations from the machine learning model system. This process is then iteratively performed, with the machine learning model system then analyzing log data generated as a result of the recommended log data level settings, and generating new identifications of possible causes and probabilities associated with those causes. To the extent a high probability cause is identified, a corresponding remedial action is determined and then performed to resolve the degradation.

Thus, the disclosed embodiments provide for improved system operation by increasing the effectiveness and reducing the cost of remote diagnostic capabilities. The disclosed embodiments ensure information collection is targeted to those network neighborhoods experiencing SLE degradation, and is set to a minimum level necessary to diagnose the issue being experienced.

FIG. 1 is an overview diagram of an example system 100 implementing one or more of the disclosed embodiments. The example system 100 includes a plurality of access points (AP1 142, . . . , AP X 144, AP 1' 150, . . . , AP X' 152) wherein an access point can be a wireless access point a router, a switch, or any other device capable of providing network access, a plurality of Authentication, Authorization and Accounting (AAA) servers (AAA server 110 is shown by way of example), a plurality of Dynamic Host Configuration Protocol (DHCP) servers (only one DHCP server 116 is shown by way of example), a plurality of Domain Name System (DNS) servers (only one DNS server 122 is shown by way of example), a plurality of Web servers (only one Web server 128 is shown by way of example), and a network management system (NMS) 136, e.g., an automated log data level setting (ALLS) system (server), which are coupled together via network 134, e.g., the Internet and/or an enterprise intranet. The network 134 includes, in some embodiments, one or more routers 185 and/or one or more switches 180. Network communications links 143, 145, 171, 173 couple the access points (AP1 142, AP X 144, AP 1' 150, AP X' 152) respectively, to network 134. Network communications link 111 couple the AAA servers (the AAA server 110 is shown by way of example) to network 134. The network communications link 117 couples the DHCP servers (e.g., DHCP server 116 is shown by way of example) to network 134. The network communications link 133 couples the virtual network assistant (VNA) servers (only one VNA server 132 is shown by way of example) to the network 134. The network communications link 123 couples the DNS servers (e.g., DNS server 122 is shown by way of example) to the network 134. The network communications link 129 couples the Web servers (e.g., web server 128) to the network 134. The system 100 further includes a plurality of user equipment devices (UE 1 138, . . . , UE Z 140, UE 1' 146, . . . , UEZ' 148). The user equipment is any wired, wireless, or optical equipment providing network access to communication devices used by users such as people or automated devices such as IoT devices. Some of the UEs (138, 140, 146, 148) are wireless devices which move within the system 100.

Within the system 100, access points are located, in at least some embodiments, at a plurality of different customer sites. Customer site 1 102, e.g., a mall, includes access points (AP 1 142, . . . , AP X 144). Customer site 2 104, e.g., a stadium, includes access points (AP 1' 150, . . . , AP X' 152). As shown by way of example in FIG. 1, UEs (UE 1 138, . . . , UE Z 140) are currently located at customer site 1 102; UEs (UE 1' 146, . . . , UE Z' 148) are currently located at customer site 2 104. Each one of the servers, routers, switches, APs, UEs NMS, and other servers attached to the network include, in some embodiments, a system log or an error log module wherein each one of these devices records the status of the device including normal operational status and error conditions.

Figure 2:
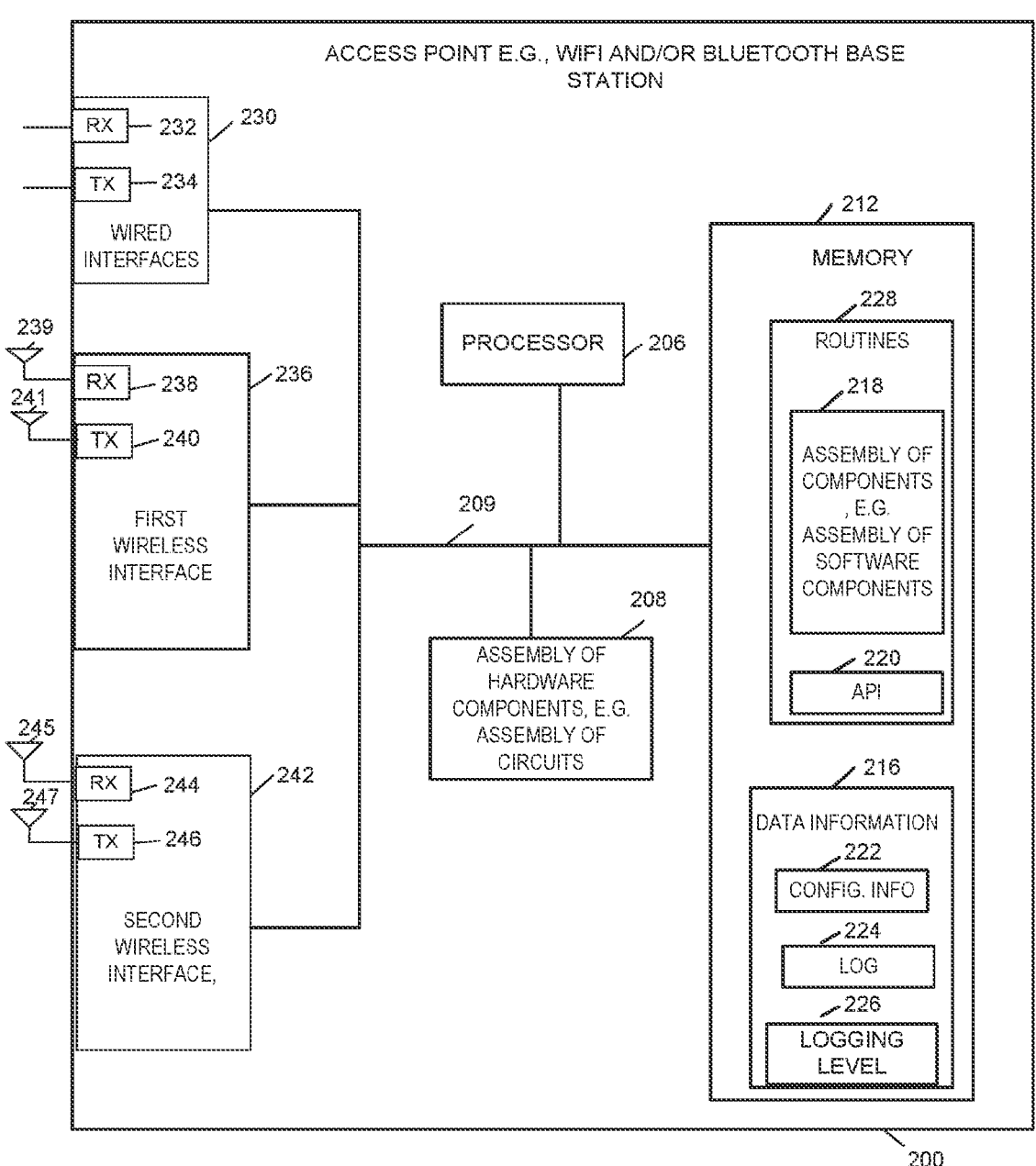
FIG. 2 is a block diagram of an example access point implementing one or more of the disclosed embodiments.

FIG. 2 is a block diagram of an example access point configured to implement one or more of the disclosed embodiments. The access point 200 shown in FIG. 2 implements, in some embodiments, any of the access points AP 1 142, . . . , APX 144, AP 1' 150, APX' 152 discussed above with respect to FIG. 1.

Access point 200 includes wired interface 230, wireless interfaces 236, 242, a hardware processor 206, e.g., a CPU, a memory 212, and an assembly of components 208, e.g., assembly of hardware components, e.g., assembly of circuits, coupled together via a bus 209 over which the various elements exchange data. Wired interface 230 includes a receiver 232 and a transmitter 234. The wired interface 230 couples the access point 200 to a network and/or the network 134 (e.g., the Internet) of FIG. 1. A first wireless interface 236, (e.g., a Wi-Fi interface, and/or 802.11 interface), includes a receiver 238 coupled to a receive antenna 239, via which the access point receives wireless signals from communications devices (e.g., wireless terminals), and a transmitter 240 coupled to a transmit antenna 241, via which the access point transmits wireless signals to communications devices, (e.g., wireless terminals). A second wireless interface 242, (e.g., a Bluetooth interface) includes a receiver 244 coupled to a receive antenna 245, via which the access point receives wireless signals from communications devices, (e.g., wireless terminals), and a transmitter 246 coupled to a transmit antenna 247 via which the access point transmits wireless signals to communications devices (e.g., wireless terminals).

A memory 212 includes routines 228 and data/information 216. Routines 228 include an assembly of components 218, (e.g., an assembly of software components), and an Application Programming Interface (API) 220. Data/information 216 includes configuration information 222, a device status log that includes error events and normal events captured as messages in a system log or an error log 224, and log data level information 226 that stores log data level setting information for the device. In some embodiments, the stored log data level setting information is based on instructions from the network management system.

Figure 3:
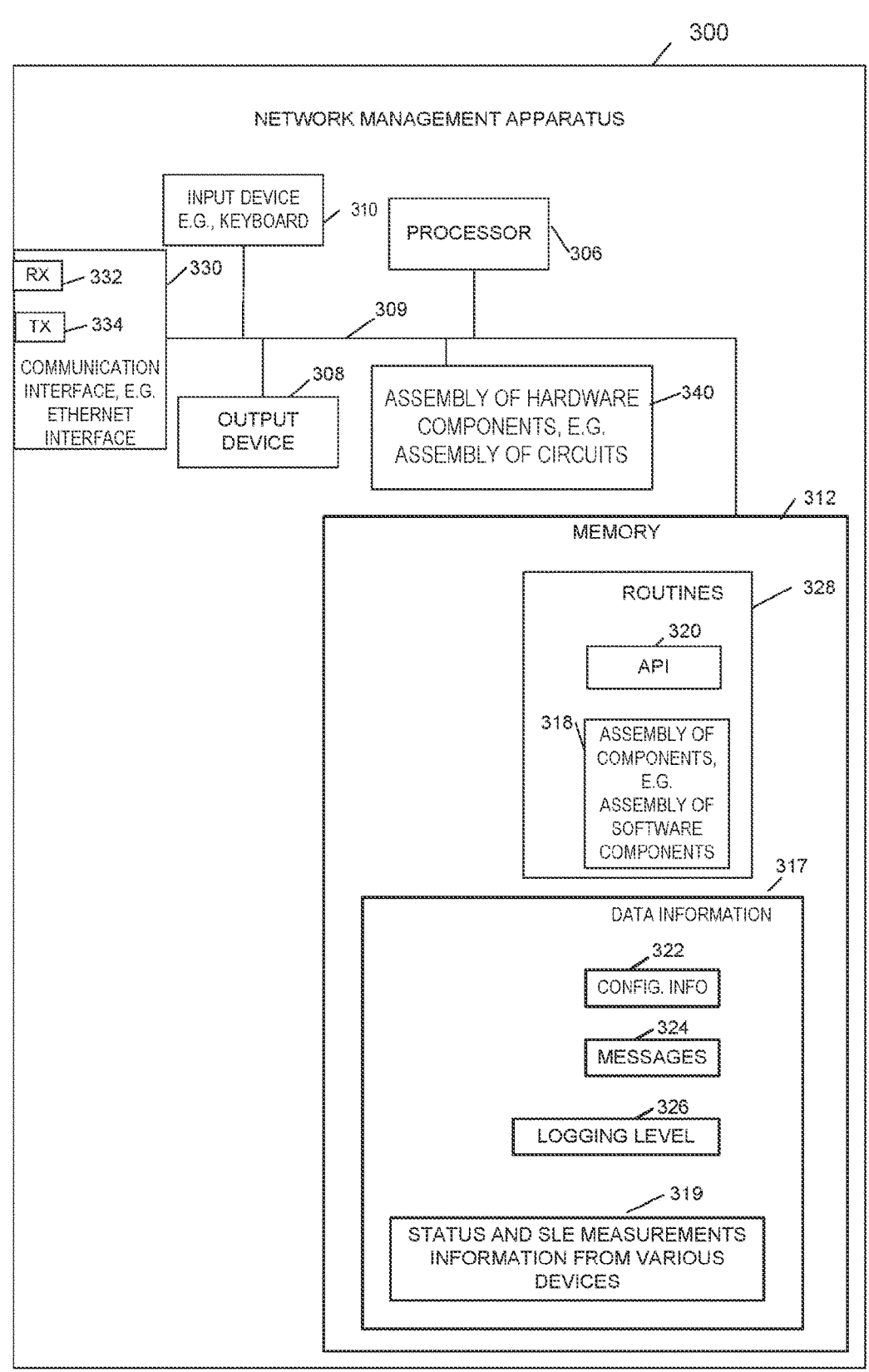
FIG. 3 shows an example network management apparatus.

FIG. 3 shows an example network management system 300. In one or more of the disclosed embodiments, the network management system controls log data level settings for one or more devices and/or components under management. In some embodiments, the network management system 300 is a network management node, e.g., a network management server such as network management automated bug reporting and resolution server. In some embodiments, the network management system 300 of FIG. 3 is the network management system (NMS) 136 of FIG. 1. In some embodiments the network management system 300 is or is part of an access point such as any one of the access points or devices shown by way of example in FIG. 1.

Network management system 300 includes a communications interface 330, a hardware processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements interchange data and information in at least some embodiments. The communications interface 330 includes an Ethernet interface in some embodiments. Communications interface 330 couples the network management system 300 to a network and/or the Internet. Communications interface 330 includes a receiver 332 via which the network management system 300 can receive data and information, e.g., including service related information, e.g., message such as messages logged in a system log or an error log from a variety of devices such as AAA server, DHCP server, Web server, routers, switches, and a transmitter 334, via which the network management system 300 can send data and information, e.g., including configuration information and instructions, e.g., instructions to access points, routers, switches, or any other server or client attached to the network, to restart, change operating parameters, download and install another SW version, etc.

In according to an example implementation the network management server can instruct devices associated with the network, or devices in a specific neighborhood of the network to increase or decrease the log data level of a specific device or of devices in a specific network neighborhood.

Memory 312 includes routines 328 and data/information 317. Routines 328 include assembly of components 318, e.g., an assembly of software components, and Application Programming Interface (API) 320. Data/information 317 includes configuration information 322, captured messages in system log 324 including messages and/or message fields as well as timing information, e.g., the time the message was logged in the system or error log. Log data level settings 326 define a log data level of each device managed by the example NMS 300. In accordance with a specific implementation, the log data level settings 326 indicate data amount information for data collected as a result of a specific log data level that is set on a specific device. The data information 317 also includes status and measurements information from the various devices 319 including RSSI information from mobile clients and user equipment (UE), achieved data rate on various links, mobility time, and other SLE related measurements from the various devices associated with the network such as network 134 of FIG. 1.

The automated log data level setting routine, which in accordance with one specific implementation is part of assembly of SW components 318, utilizes the log data level settings 326 to ensure that the total data resulting from the overall system logging does not exceed a predetermined threshold.

Figure 4:
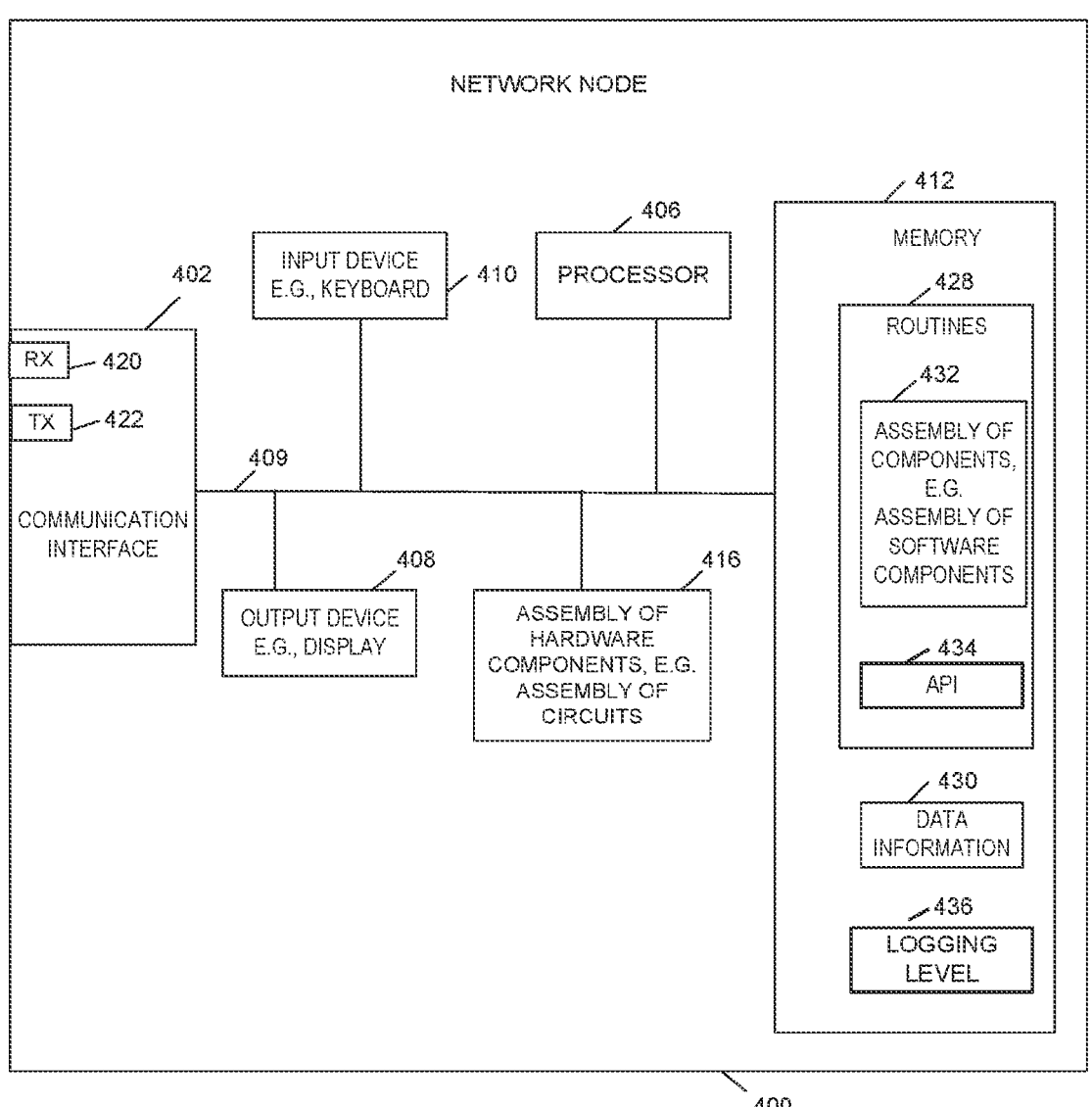
FIG. 4 shows an example network node.

FIG. 4 shows an example network node 400. In one or more of the disclosed embodiments, the network node 400 implements a device or a server attached to the network 134, e.g., router, switch, AAA server, DHCP server, DNS server, VNA, Web server, etc., or a network device such as, e.g., routers 185, switches 180, etc. In some embodiments, any one or more of AAA server 110, DHCP server 116, DNS server 122, or the web server 128, routers 185, or switches 180 of FIG. 1 implement the structure of the device described with respect to the network node 400 of FIG. 4. Network node 400, e.g. a server, includes a communications interface 402, e.g., an Ethernet interface, a hardware processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements, in some embodiments, interchange data and information. A communications interface 402 couples the network node 400 to a network and/or the Internet. Though only one interface is shown by way of example, those skilled in the art should recognize that some embodiments of routers and/or switches have multiple communication interfaces. A communications interface 402 includes a receiver 420 via which the network node 400, (e.g. a server), can receive data and information. The data and information includes, in some embodiments, operation related information, such as a registration request, AAA services, DHCP requests, Simple Notification Service (SNS) look-ups, or Web page requests. The communications interface 402 also includes a transmitter 422, via which the network node 400, e.g., a server, can send data and information, e.g., including configuration information, authentication information, web page data, etc.

A memory 412 includes routines 428, data/information 430, and log data level settings 436. Routines 428 include an assembly of components 432, (e.g., an assembly of software components) and information 430, and API 434. Information 430 includes system log and/or error log. The routines 428 also include one or more functions that implement logging capabilities for the device. The logging capabilities are tailored to be consistent with log data level information stored in the log data level settings 436. In some embodiments, the log data level settings 436 are controlled by a network management system. For example, the network management system, in some embodiments, sets log data levels in the network node 400 by sending it a network message indicating the log data level.

Figure 5:
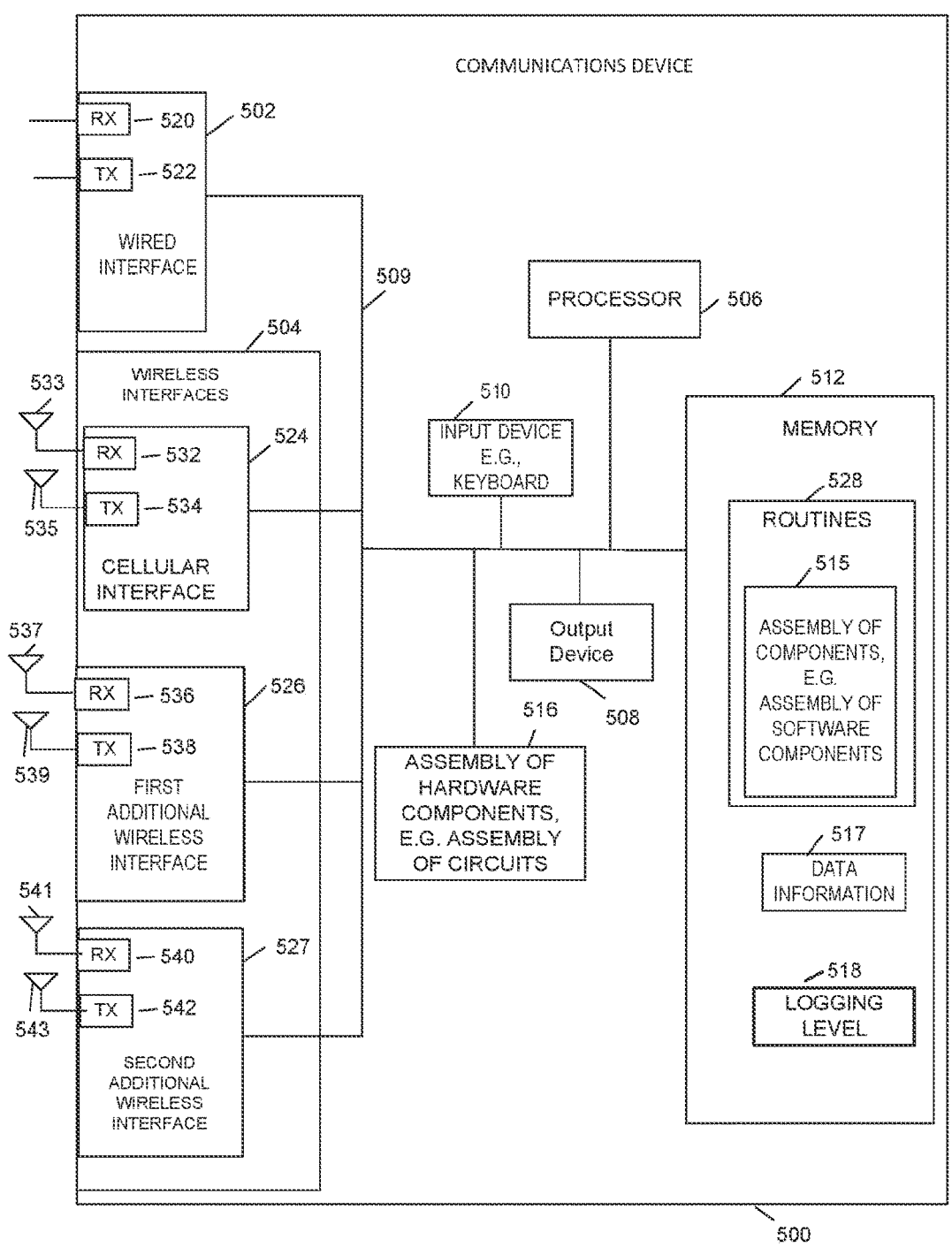
FIG. 5 shows an example communications device.

FIG. 5 shows an example communications device 500. The communications device 500, in one or more of the disclosed embodiments, implements a user equipment (UE) device, such as any one or more of user equipment UE 1 138, . . . , UE Z 140, UE 1' 146, . . . , or UE Z' 148. The example communications device 500 includes wired interfaces 502, wireless interfaces 504, a hardware processor 506 (e.g., a CPU), an output device 508, an input device 510, a memory 512, and an assembly of components 516 (e.g., assembly of hardware module), e.g., assembly of circuits, coupled together via a bus 509 over which the various elements exchange data. The wired interface 502 includes a receiver 520 and a transmitter 522. The wired interface 502 couples the communications device 500 to a network (e.g., the network 134, (e.g., the Internet).

The wireless interface 504 includes a cellular interface 524, a first additional wireless interface 526 (e.g., a 802.11 WiFi interface), and a second additional wireless interface 527 (e.g., a Bluetooth interface). The cellular interface 524 includes a receiver 532 coupled to a receiver antenna 533 via which the communications device 500, receives wireless signals from access points, e.g., such as any one or more of AP 1 142, . . . , APX 144, AP 1' 150, APX' 152), and a transmitter 534 coupled to a transmit antenna 535 via which the communications device 500 transmit wireless signals to APs, (e.g., AP 1 142, . . . , APX 144, AP 1' 150, . . . , APX' 152). The first additional wireless interface 526 includes a receiver 536 coupled to a receive antenna 537, via which the communications device 500, receives wireless signals from communications devices, (e.g., APs), and a transmitter 538 coupled to a transmit antenna 539 via which the communications device 500, transmits wireless signals to communications devices. The second additional wireless interface 527 includes a receiver 540 coupled to a receive antenna 541, via which the communications device 500 receives wireless signals from communications devices, and a transmitter 542 coupled to a transmit antenna 543 via which the communications device 500 transmit wireless signals to communications devices.

The memory 512 includes routines 528, data/information 517, and log data level settings 518. The routines 528 include an assembly of components 515 (e.g., an assembly of software components). Data/information 517 includes, in at least some embodiments, configuration information as well as any additional information required for normal operations of UE 500. Data information includes a system log or an error log, in at least some embodiments. The log data level settings 518 define a log data level for the device. In some embodiments, the log data level settings 518 are set based on instructions from the network management system and, some embodiments, from the log data level setting server which in some implementations is included as part of the network management system.

Figure 6A:
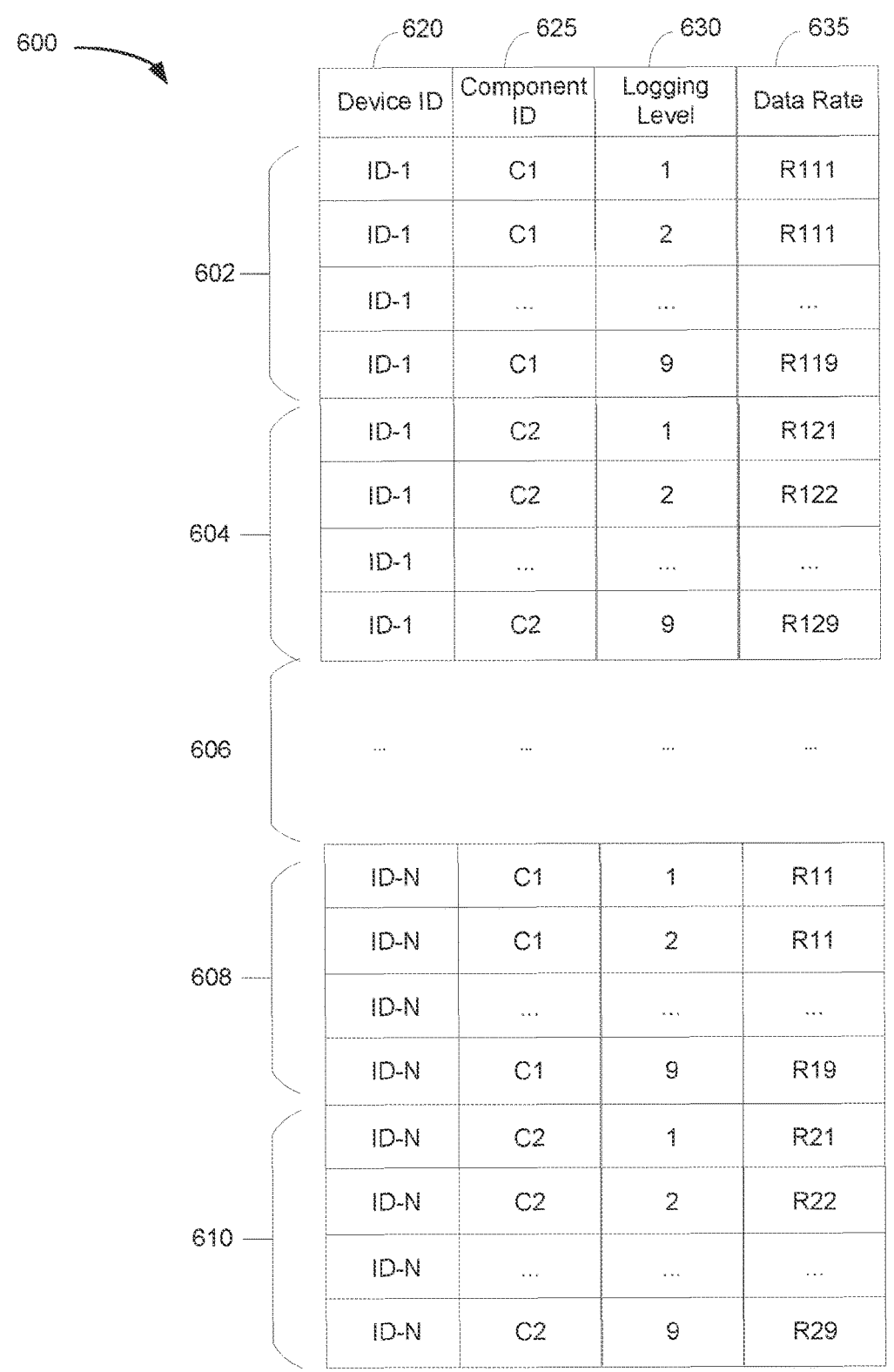
FIG. 6A illustrates example log data level management table.

FIG. 6A illustrates example log data level management data 600 in accordance with one or more embodiments. While the log data level management data 600 of FIG. 6A is presented in a table format, the disclosed embodiments are not limited to data organizations that store the log data level management data 600 in table format.

The log data level management data 600 includes device identifiers 620 in a first column, and component identifiers 625 are shown in a second column. Component identifiers 625 in this context each uniquely identify separable components of a computer system. For example, one of the component identifiers 625 identifies, in various aspects, one or more of a software component, hardware component, device, computer, client device, or other component. Log data levels 630 are stored in a third column. In some embodiments, a verbosity or volume of logging data produced by a component increases as a log data level is increased numerically. Other embodiments reduce verbosity or volume of logging data as the log data level is increased. Logging data rates 635 generated at each log data level for each component are denoted in a right most column of the table.

Portion 602 illustrates data rates of the logging information generated by first component (ID C1) of first device (ID-1) when the component is instructed to operate at log data levels e.g., 1 through 9. The resulting logging data rates 635 are illustrated as R111 through R119.

Similarly, portions 604, 606, 608, and 610 illustrate data rates of logging information generated by specific component (ID $C_k$) of first $j^{th}$ device (ID-j) when the component is instructed to operate at log data levels e.g., 1 through 9. The resulting logging data rates 635 are illustrated as $R_{jkl}$ where j denotes the device ID, k denotes the specific component within device j, and l denotes the log data level.

In accordance with one example implementation, a logging data rate $R_{jkl}$ is determined experimentally and configured automatically. In accordance with another example implementation, data rates of logging data are monitored. Data analogous to the log data level management data 600 is then updated based on the rates determined by the monitoring. In some embodiments, maximum rates are stored as part of the log data level management data and/or average rates.

Figure 6B:
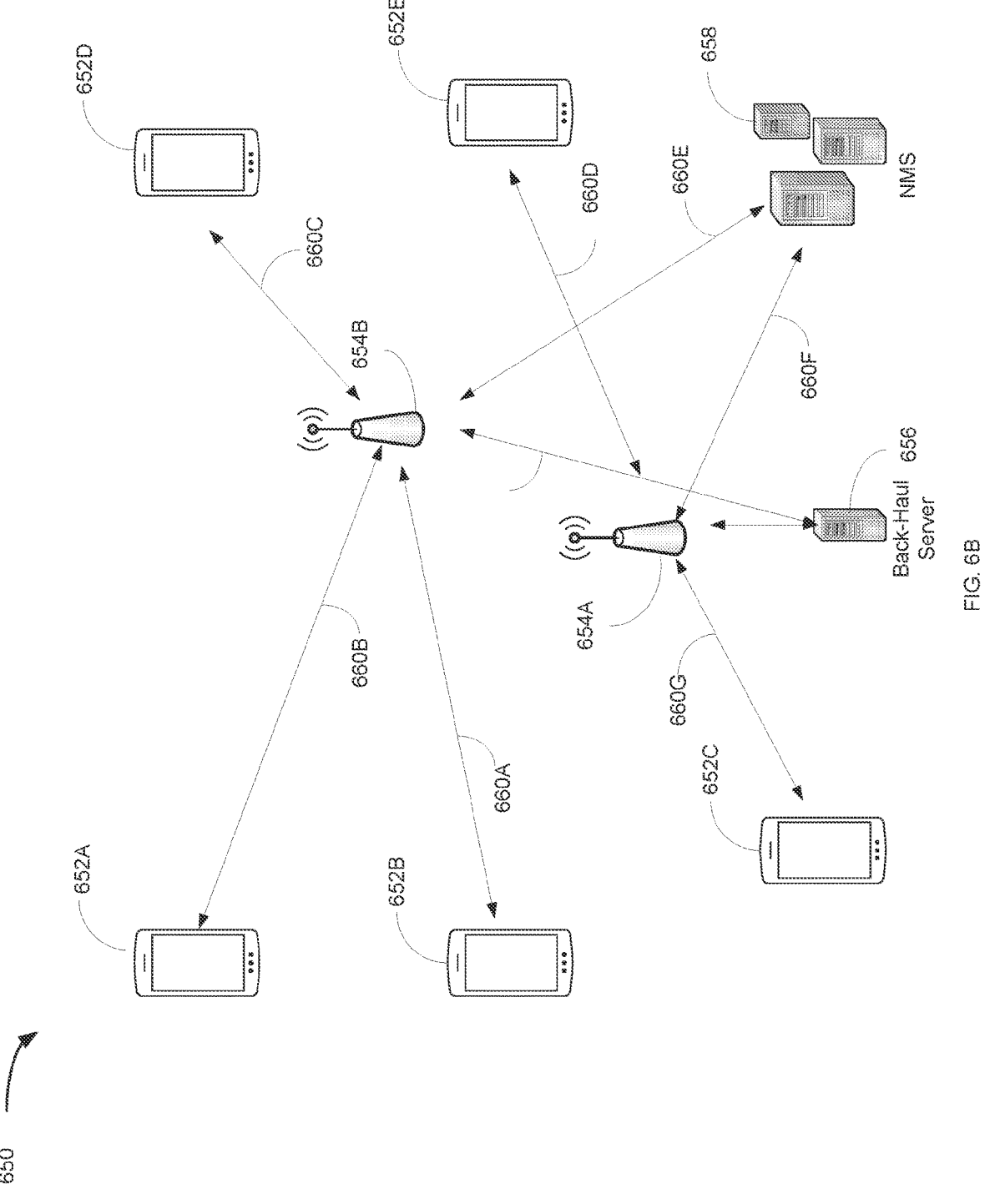
FIG. 6B is an overview diagram of a network implementing one or more of the disclosed embodiments.

FIG. 6B is an overview diagram of a network implementing one or more of the disclosed embodiments. FIG. 6B shows two access points, AP 654A and AP 654B. Each of the access points are in communication with a plurality of wireless terminals. For example, the AP 654B is associated with and/or in communication with wireless terminal 652A, wireless terminal 652B, and wireless terminal 652D. AP 654A is associated with and/or in communication with wireless terminal 652C, and wireless terminal 652E. Each of the AP 654A and AP 654B are also in communication with a back-haul server 656. In some embodiments, the AP 654B communicates with a switch, which is positioned between the back-haul server 656 and the AP. The back-haul server 656 provides network connectivity between AP 654A and AP 654B and other devices accessible via a wired network, at least in some embodiments.

The AP 654A and the AP 654B are also in communication with a network management system (NMS) 658. In some embodiments, the NMS 658 is analogous to the NMS 136 discussed above with respect to FIG. 1. Thus, in some embodiments, the access points and wireless terminals of FIG. 6B are analogous to any one or more of the devices located at the site 102 and/or site 104 of FIG. 1.

Some embodiments provide operational parameter values of one or more of the AP 654A, AP 654B, wireless terminal 652A, wireless terminal 652B, wireless terminal 652C, wireless terminal 652D, and wireless terminal 652E to the NMS 658. In some embodiments, the operational parameter values are provided to a machine learning model to identify causes of degradations of the system 650. The NMS 658 also, in some embodiments, receives output from the machine learning model indicating one or more possible causes of degradations, and, in some embodiments, probabilities associated with each of the identified possible causes. In some embodiments, the NMS 658 also establishes a level or verbosity of data logging by one or more of the AP 654A, AP 654B, back-haul server 656, wireless terminal 652A, wireless terminal 652B, wireless terminal 652C, wireless terminal 652D, or the wireless terminal 652E. As discussed above, in some embodiments, the NMS 658 is configured to establish a level of logging by one or more of these devices, and/or one or more components of each of the devices, so as to provide sufficient data to a machine learning model to identify a root cause of a degradation in system operation while also ensuring the level of logging does not saturate or otherwise overwhelm the capabilities of the system 650.

While FIG. 6A illustrates that different log data levels generally result in different logging data rates, the modification of a log data level, in some embodiments, modifies the set of particular operational parameter that a are being logged. For example, a first set of parameters is logged at a first log data level, and a second set of parameters is logged at a second log data level, with the second set of parameters including the first set of parameters and also at least one additional operational parameter that is not included in the first set of parameters. Thus, some embodiments store a data structure that maps log data levels of one or more devices and/or components to sets of operational parameters logged at the respective data level. In some embodiments, the data structure is provided to a machine learning model as discussed below to allow the machine learning model to map between log data levels of a device and/or component and which operational parameter values are logged at a particular log data level.

FIG. 6B also shows message exchanges 660A-G between some of the devices illustrated in FIG. 6B. One or more of the message exchanges 660A-G include only one message, but also represent, in some embodiments, one or more messages transmitted from one device to another. The message exchanges 660A-G illustrate communication of one or more of operational parameter values, and/or logging data, either directly or indirectly, to the NMS 658. For example, the message exchange 660A shows data flowing from the wireless terminal 652B to the AP 654B. The data can include operational parameter values and/or logging data generated by the wireless terminal 652B. Upon receiving the operational parameter values and/or logging data, the AP 654B provides that information to the NMS 658, via message exchange 660E. As discussed above, in some embodiments, the NMS 658 controls a log data level or verbosity of logging of one or more of the devices illustrated in FIG. 6B. To that end, the NMS 658 sets, in some embodiments, a log data level of a wireless terminal, such as wireless terminal 652B, by sending the log data level to the AP 654B via message exchange 660E, which then forwards a command to the wireless terminal 652B, via message exchange 660A, to set its log data level to a level commanded by the NMS 658. The NMS 658 is able to receive operational parameter values and/or logging data from any of the devices illustrated in FIG. 1, and to control any of the devices illustrated in FIG. 6B in a similar manner. While FIG. 6B depicts message communication directly between the AP 654A, AP 654B, and the NMS 658, in some embodiments, communication between an AP and the NMS 658 flows through the back-haul server 656.

Figure 7:
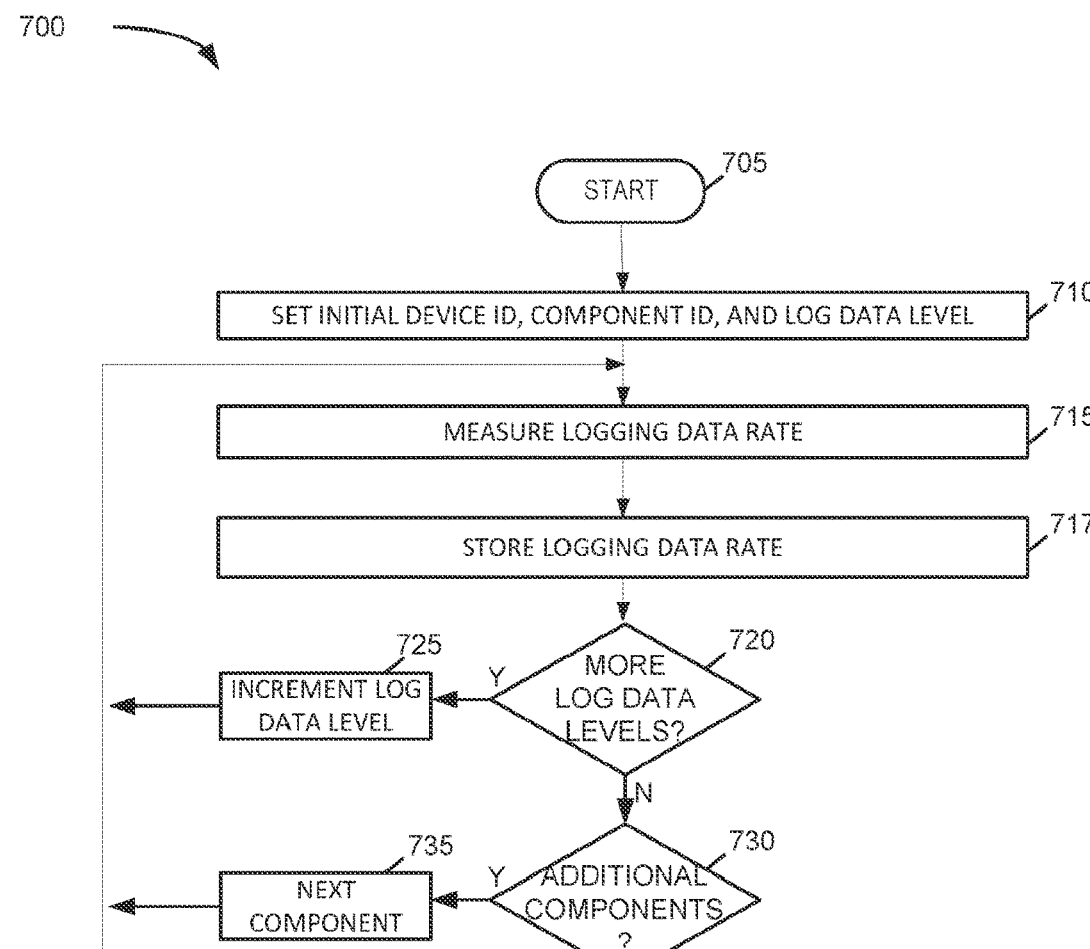
FIG. 7 is a flowchart of an example method 700 of collecting logging data rate information

FIG. 7 is a flowchart of an example method 700 of collecting logging data rate information. In some embodiments, one or more of the functions discussed below with respect to FIG. 7 and method 700 is performed by hardware processing circuitry. For example, one or more hardware memories (e.g. memory 212, memory 312, memory 412, memory 512) store instructions (e.g., routines 228, routines 328, routines 428, routines 528) that when executed configure the hardware processing circuitry (e.g. hardware processor 206, hardware processor 306, hardware processor 406, hardware processor 506) to perform the one or more functions of the method 700 discussed below.

Method 700 begins at start operation 705 and then moves to operation 710, where a device identifier, component identifier, and an initial log data level of the identified device and component are set.

In operation 715, the logging data rate is measured. In some embodiments, measuring the logging data rate includes monitoring network traffic visible to a device executing the method 700. Some embodiments employ a packet or network message filter that separates logging data from other network data transmitted over a network. For example, in some embodiments, network traffic having a particular destination port or source port is considered logging data in some embodiments. In some other embodiments, particular URLs in network traffic identify the traffic as logging data. Thus, the filter, in thee embodiments, filters traffic including the particular URLs and identifies logging data in that traffic. In some embodiments, the logging data is collected via an application programming interface (API) supported by a component generating the log data. The API is accessed locally, on a common computer or in some circumstances, the API is invoked from a separate computer via a computer network. A rate is then determined based on the collected or detected logging data. In accordance with yet another implementation the rate of logged data is measured by the NMS such as NMS 136 of FIG. 1 or NMS 658 of FIG. 6 as it receives the logging data messages from a specific device.

In operation 717, the logging data is stored in a data store.

Decision operation 720 determines whether additional logging settings for a currently selected device and component are available for analysis. For example, some devices support 3, 4, 5, 6, 7 or another level of different log data levels, each of which generate a different amount and/or rate of data. Thus, decision operation 720 determines if, for a particular device and component, whether all the log data levels supported by the device have been evaluated by the method 700. If more log data levels remain to be evaluated, the method 700 moves from decision operation 720 to operation 725, which increments or otherwise selects an additional log data level not yet evaluated by the method 700. Method 700 then moves from operation 725 to operation 715 and the data rate associated with the new logging setting is measured and stored. If there are no further log data levels to evaluate for the selected device and component, method 700 moves to decision operation 730, which determines if logging data rates of additional components of the currently selected device still remain to be evaluated. If additional components do remain, method 700 moves from decision operation 730 to operation 735, where an additional component of the existing selected device is identified.

Method 700 then moves from operation 735 to operation 715 and the data rate associated with the new device component is measured and stored. If there are no further components of the currently selected device to evaluate, method 700 moves from decision operation 730 to decision operation 740, which evaluates whether there is additional device to be evaluated for its logging data rate. If there is additional device, method 700 moves from decision operation 740 to operation 745, where an additional device is selected. Method 700 then moves from operation 745 to operation 715 and the data rate associated with the new device is measured and stored; and method 700 continues to iterate. Otherwise, if no devices remain for evaluation, method 700 moves from decision operation 740 to end operation 750.

Figure 8:
FIG. 8 is a flowchart of a method of maintaining a logging data rate.
Figure 8:
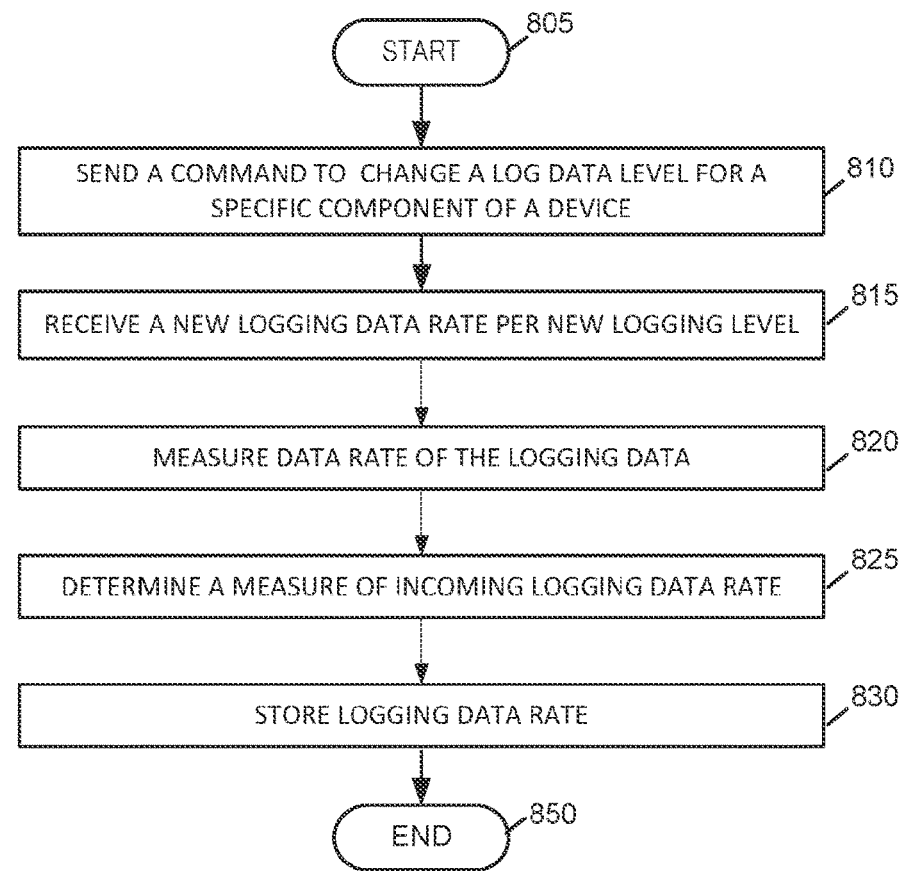

FIG. 8 is a flowchart of an example method of maintaining a logging data rate. In some embodiments, one or more of the functions discussed below with respect to FIG. 8 and method 800 are performed by hardware processing circuitry. For example, one or more hardware memories (e.g. memory 212, memory 312, memory 412, memory 512) store instructions (e.g., routines 228, routines 328, routines 428, routines 528) that when executed configure the hardware processing circuitry (e.g. hardware processor 206, hardware processor 306, hardware processor 406, hardware processor 506) to perform the one or more functions of the method 800 discussed below.

Method 800 begins at start operation 805 and then moves to operation 810. In operation 810, a command is received to change a log data level of a component. In some embodiments, the command indicates that a log data level of a device is to be set to a particular level (e.g., some devices do not support component log data level settings). In some embodiments, operation 810 includes modifying the log data level based on the command. For example, in some embodiments, a device performing the method 800 invokes an API of a device to change the device's log data level (or a component of the device's log data level).

In operation 815 logging data is received at the new data-rate is received.

Operation 820 measures a data rate of the logging data received in operation 815.

In operation 825, a logging data rate is established for the given log data level setting. In one example implementation, the measure is a maximum data rate of the logging data rate received in operation 815. In some other embodiments, a weighted average of past measured rates and more recent measured rates within that logging data received in operation 815 is determined. For example, some embodiments determine the rate according to Equation 1 below:

$$\text{Measure of data rate } (t) = \alpha * \text{measured data rate } (t) + (1-\alpha) * \text{stored data rate } (t-1) \qquad \text{Eq. 2}$$

where:

$\alpha$—a predetermined filtering parameter ($0 < \alpha < 1$).

In various embodiments, other measures of the data rate are employed, such as linear and non-linear combinations of a previously determined data rate and a more recently determined data rate are contemplated as well.

In operation 830 the determined logging data rate, e.g., data rates such as those represented as Rjkl of FIG. 6, is stored and replaces the older stored logging data rate.

$$\text{Stored data rate } (t) = \text{Measure of data rate } (t) \qquad \text{Eq. 2}$$

After operation 830, the method 800 moves to end operation 850.

Figure 9:
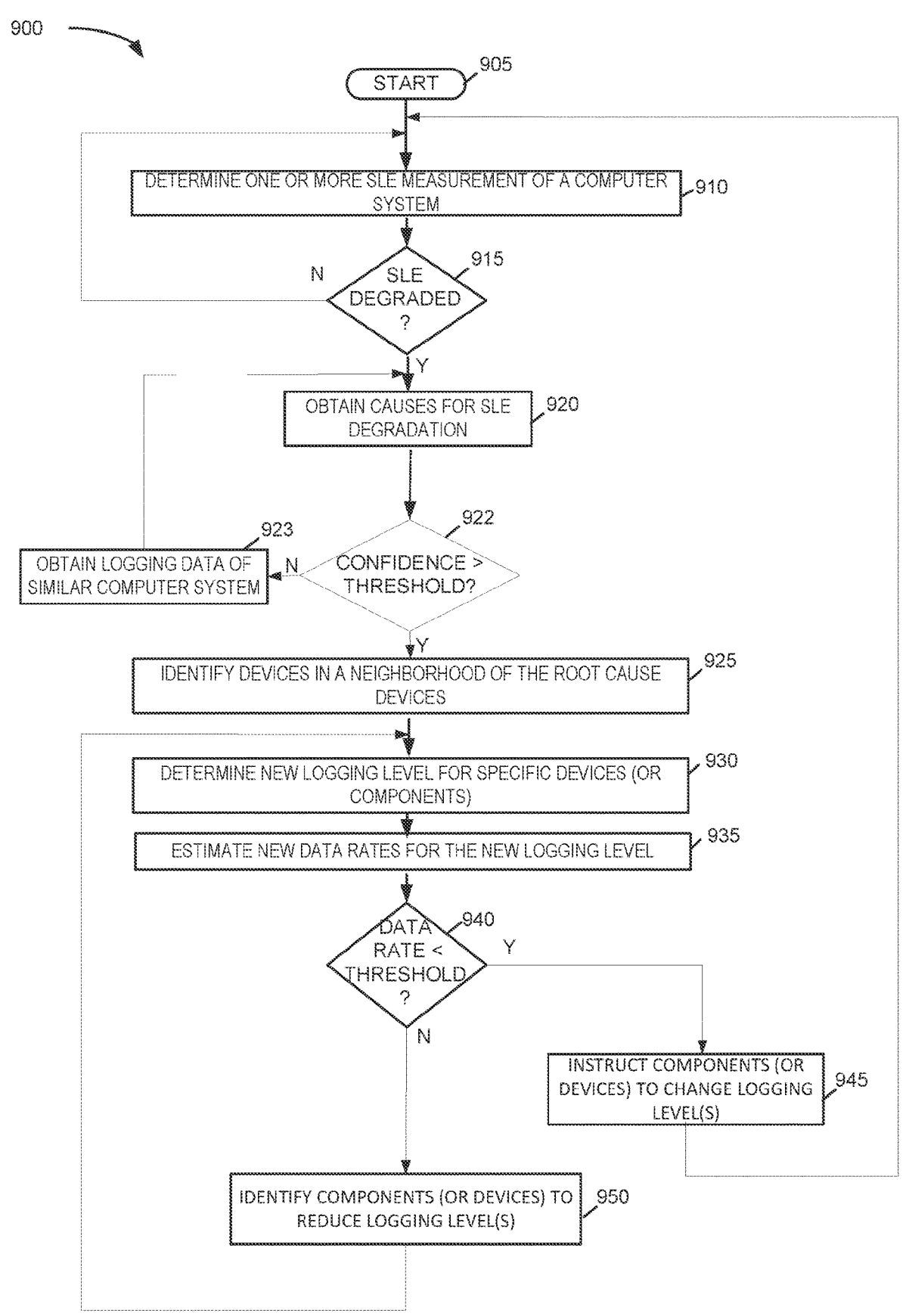
FIG. 9 is a flowchart of a process for modifying a log data level of one or more components or devices.

FIG. 9 is a flowchart of an example method of modifying a log data level of one or more components or devices. In some embodiments, one or more of the functions discussed below with respect to FIG. 9 and the method 900 is performed by hardware processing circuitry. For example, one or more hardware memories (e.g. memory 212, memory 312, memory 412, memory 512) store instructions (e.g., routines 228, routines 328, routines 428, routines 528) that when executed configure the hardware processing circuitry (e.g. hardware processor 206, hardware processor 306, hardware processor 406, hardware processor 506) to perform the one or more functions of the method 900 discussed below.

The method 900 begins at start operation 905 and then moves to operation 910. In operation 910, one or metrics are determined based on operation of a computer system. In some embodiments, the metrics represent a service level experience provided by the computer system. For example, the metrics include, in some embodiments, one or more of a throughput measurement, a network jitter measurement, a signal strength measurement (e.g., a received signal strength indication RSSI)), a mobility measurement, a response time measurement, a latency measurement, one or more metrics that relate to packet errors, dropped packet counts, dropped connections, number of active users, utilization of hardware processors, memories, I/O bandwidth, or other measures of computer system performance.

Decision operation 915 determines whether a service level experience of the computer system is degraded. For example, the metrics determined in operation 910 are evaluated against one or more criterion in some embodiments of decision operation 915. For example, the metrics are evaluated, in some embodiments, against one or more thresholds or values ranges to determine whether the computer system is experiencing a degradation in service level experience.

In operation 920, a root cause of the degradation is determined. Some embodiments make use of separate or third party tools, e.g., the Juniper virtual network analyst (VNA), to determine a source of the degradation. In some embodiments, logging data is provided to a machine learning model, and the machine learning model identifies a root cause of the degradation.

Decision operation 922 evaluates whether a confidence level associated with the root cause determination is above a threshold. For example, in some embodiments, a machine learning model of operation 920 outputs, along with an indication of a root cause of a degradation, an associated confidence level or probability associated with the identification of the root cause. If the confidence or probability is below the predefined threshold, method 900 moves from decision operation 922 to operation 923. In operation 923, logging data of a similar computer system is obtained and is used to enhance the confidence level of the root cause of the SLE degradation. Otherwise, if the confidence or probability associated with the root cause identification is above the confidence threshold, method 900 moves from decision operation 922 to operation 925.

In operation 925, devices within a neighborhood of the root cause of the degradation are identified. For example, in some embodiments, if operation 920 identifies a root cause of the degradation as a first device, other devices in communication with the first device are included as part of the neighborhood. In some embodiments, other devices within a maximum physical distance are included as part of the neighborhood. In some embodiments, devices having a signal strength measurement above a threshold at the first device are included in the neighborhood.

In operation 930, log data levels of each device in the neighborhood (and/or components of each of the devices) is determined. In some embodiments, the log data level of each device is set based on a proximity of the device to the offending device identified in operation 920. Thus, devices more proximate to the offending device may be configured by the ALLS for an increased verbosity of logging relative to devices that are less proximate.

Some embodiments of operation 930 determine a probability that each device in the neighborhood is contributing to the degradation of performance identified in decision operation 915. The log data level of a device or component is then set based on its respective probability.

In some embodiments, operation 930 establishes a priority list of devices and/or components in the neighborhood. In some embodiments, a priority of a device or component in the priority list is based on the probability that each device or component in the neighborhood is contributing to the degradation of performance. In some embodiments, a device or component priority in the priority list is based on a type of the device (e.g. an access point, wireless terminal, server, or other device type), a version number of software running on the device, or other factors.

In operation 935, a new aggregate logging data rate is estimated based on the log data levels of operation 930 and, for example, data analogous to the log data level management data 600, discussed above with respect to FIG. 6A.

Decision operation 940 determines whether the new aggregate logging data rate is greater than a predetermined threshold. If the new rate is below a threshold, method 900 moves from decision operation 940 to operation 945, where the devices and/or components of the computer system are instructed to set their log data levels according to the levels determined in operation 930. Method 900 then moves from operation 945 to operation 910.

If the new rate determined in operation 935 exceeds the threshold, method 900 moves from decision operation 940 to operation 950, where components or devices are identified for a reduction in their log data level. In some embodiments, a priority list of devices and/or components included in the neighborhood is consulted (e.g. the priority list determined in some embodiments of operation 930 above). The reductions in log data level are then set in a manner consistent with the priority list (e.g. higher priority devices/ components receive less of a reduction in log data level than lower priority devices). In some embodiments, the reduction in log data levels is weighted based on the device's priority (with lower numerical priorities being higher priority than higher numerical priorities). Alternatively, the reduction in log data levels is weighted based on the inverse of the device's priority. After the log data levels have been reduced appropriately, method 900 moves to operation 930 and processing continues.

Figure 10:
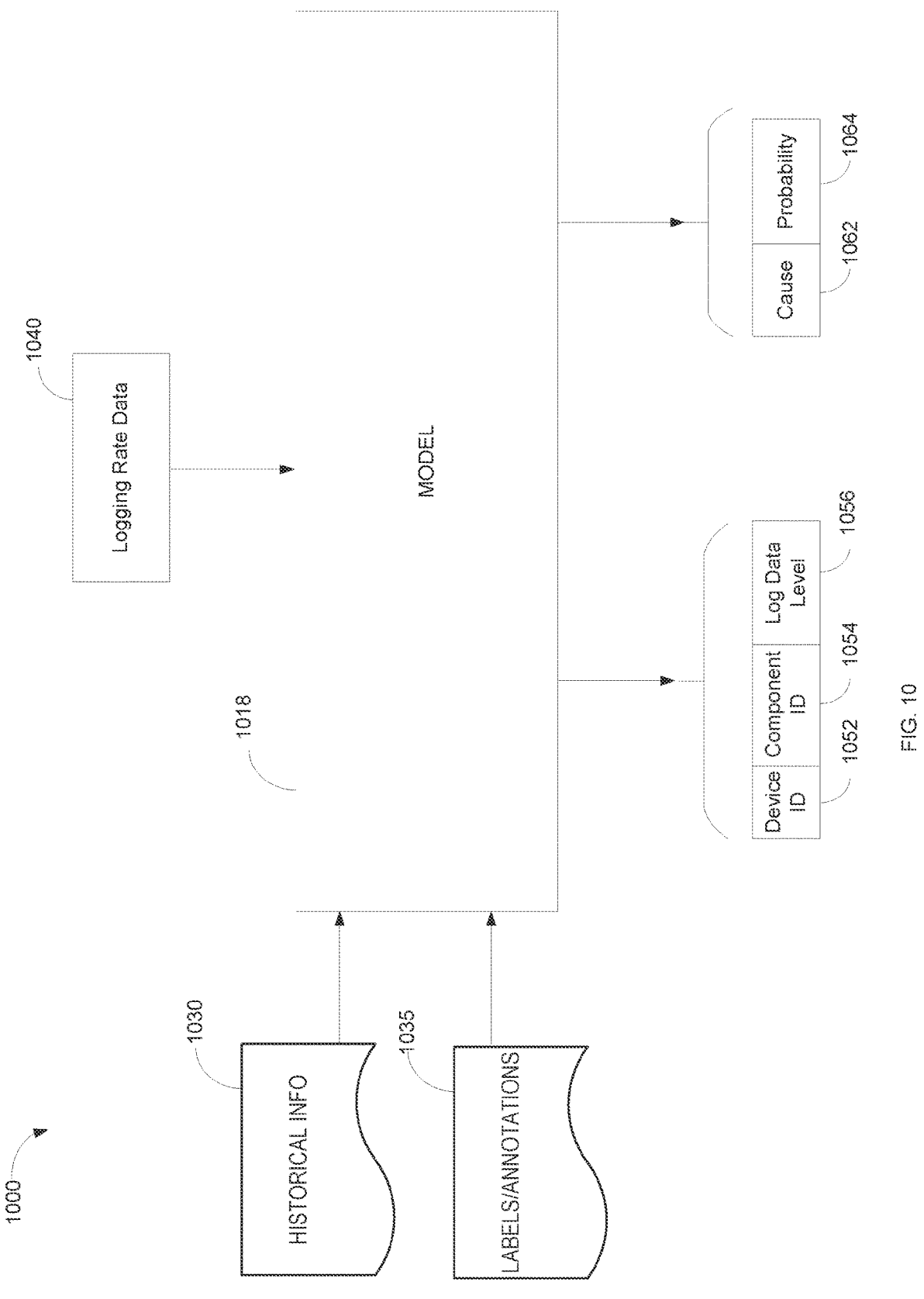
FIG. 10 illustrates an example data flow of a machine learning model that is implemented in one or more of the disclosed embodiments.

FIG. 10 illustrates an example data flow of a machine learning model that is implemented in one or more of the disclosed embodiments. In some embodiments, the machine learning model 1018 is implemented by the NMS 136, discussed above with respect to FIG. 1. In some other embodiments, the machine learning model 1018 is implemented by a computer system that is physically distinct from the NMS 136, and communicates with the NMS 136.

The data flow 1000 of FIG. 10 shows a machine learning model that is trained so as to provide recommendations on setting of a log data level for one or more devices and/or components of those devices. By setting the log data level, the machine learning model 1018 is able to facilitate improvements in an identification of a root cause of a degradation of performance in a monitored system. The machine learning model 1018 also provides indications of a root cause and a probability associated with the identification of the root cause. Thus, in some embodiments, a machine learning model is trained to tailor the log data level of one or more devices and/or components to increase the probability of an identification of a root cause while also minimizing an amount of log data necessary to provide a sufficiently high probability of root cause identification.

FIG. 10 shows a machine learning model 1018 that receives historical information 1030 and labels/annotation information 1035. The machine learning model 1018 also receives logging rate data 1040 in some embodiments. In some embodiments, the logging rate data 1040 is analogous to the data described above with respect to FIG. 6A. The logging rate data 1040 allows the machine learning model 1018 to map between particular log data levels and an amount or rate at which log data is generated when those various levels are active. As discussed above, some embodiments maintain a mapping between log data levels of one or more devices and/or components of devices and a set of operational parameter sets that are logged at particular levels of the log data levels. In some embodiments, this information is provided to the machine learning model 1018. This information allows the machine learning model 1018 to form associations between a particular log data level of a device and/or device component, FIG. 10 illustrates the machine learning model 1018 generating log data level recommendations including a device identifier 1052, a component identifier 1054, and a log data level 1056. The log data level indicates a recommendation by the machine learning model of log data levels that may be helpful in increasing probability associated with root causes identified by the machine learning model. In some embodiments, the NMS 136 and/or NMS 658 receive the log data level recommendations from the machine learning model 1018 and then apply the recommended log data level settings by communicating with the indicated device, and/or an intermediate device (e.g., a log data level recommendation for a wireless terminal causes, in some embodiments, the NMS to communicate the log data level to an access point to which the wireless terminal is associated. The access point then passes the log data level setting to the wireless terminal.

FIG. 10 also illustrates the machine learning model 1018 generating cause information including a cause indicator 1062 and a probability 1064 associated with the cause identified by the cause indicator 1062. In some embodiments, the machine learning model 1018 generates one or more pairs of cause information (indicated by cause indicator 1062) and an associated probability 1064. The cause indicator 1062 indicates, in some embodiments, a device and/or a component of a device that is contributing to a degradation of a computer system being monitored or otherwise analyzed by the machine learning model 1018. For example, the cause indicator 1062 indicates, for example, an IP or station address of a particular device contributing to the degradation. Some embodiments assign component identifiers to device components, such as a wireless interface, CPU, or other hardware or software components. Thus, in some embodiments, the cause indicator 1062 includes a component identifier that identifies such a device component as a root cause. For example, some embodiments provide for a reset capability of particular software components that does not require a reset of an entire device or device hardware. In some cases, if the cause indicator 1062 indicates a particular software component of a device is a likely cause of a degradation, as discussed below, a mitigating action to resolve the degradation includes, in some embodiments, to send a command to the device indicating it is to reset the identified software component.

The associated probability indicates a likelihood or probability that a system being analyzed by the machine learning model 1018 is experiencing a degradation based on the cause. Thus, some implementations are then able to consider multiple possible root causes, their associated probabilities, and take remedial actions associated with one or more of the highest probability root causes.

Figure 11:
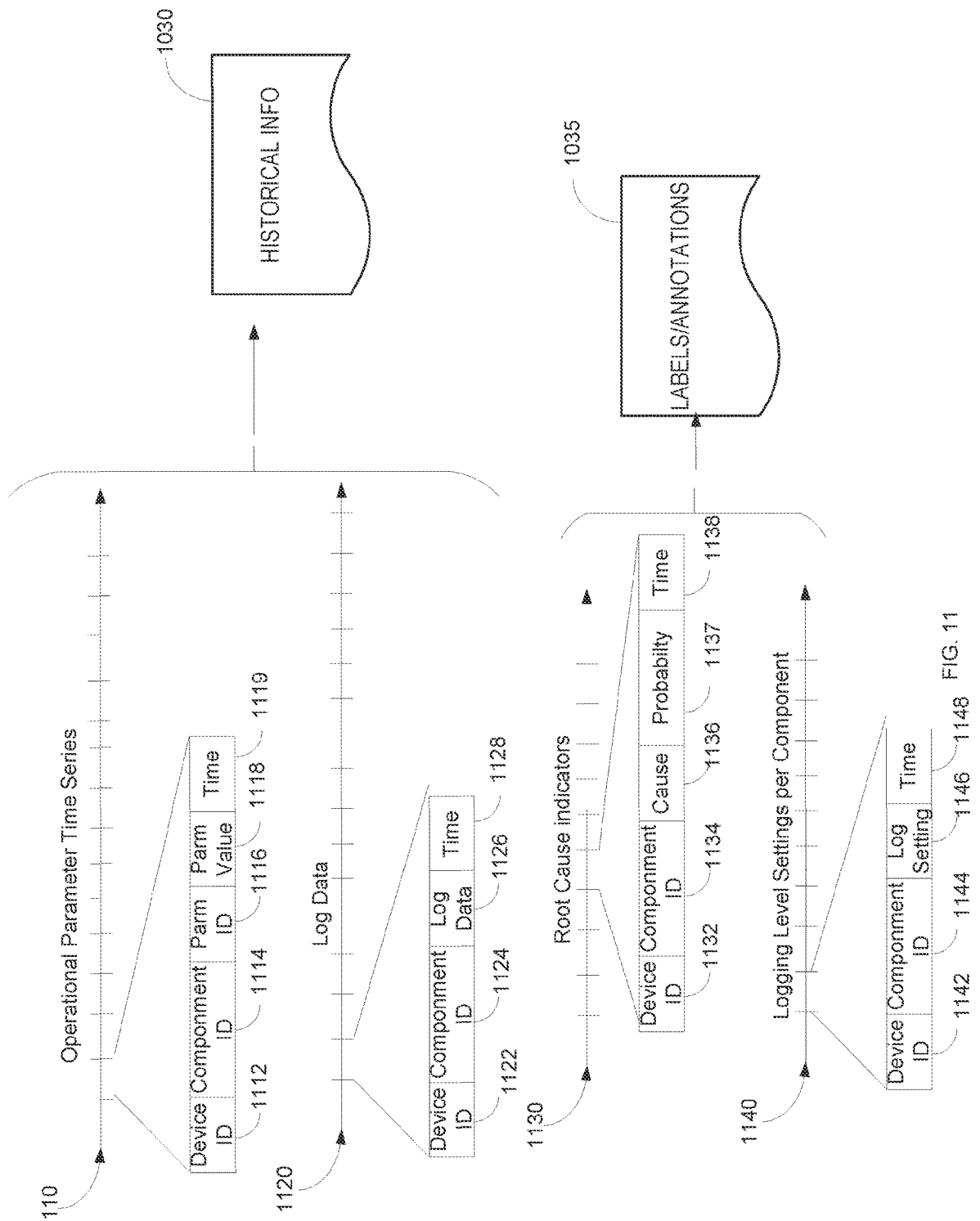
FIG. 11 illustrates example training data flows implemented in one or more of the disclosed embodiments.

FIG. 11 illustrates example training data flows implemented in one or more of the disclosed embodiments. FIG. 11 first shows that the historical information 1030 discussed above with respect to FIG. 10 includes, in some embodiments, a time series 1110 of operational parameter values, and time series 1120 of logging data. The time series 1110 of operational parameter values includes a plurality of operational parameter time series, with each time series representing a single operational parameter value over time. Operational parameter values are device specific in at least some embodiments, and thus include identification of a device from which they derive. The operational parameter values include, in some embodiments, one or more of CPU utilization, memory utilization, I/O utilization, a throughput measurement, a latency measurement, or other measurements of a computer systems performance or capacity. FIG. 11 shows an example structure of each entry in an operational parameter time series. FIG. 11 shows that an entry in a time series includes, in some embodiments, a device identifier 1112, identifying a device from which the operational parameter value derives, a component identifier 1114, identifying a component of the identified device from which the operational parameter value derives, an operational parameter identifier 1116, indicating the operational parameter value being provided (e.g. whether the operational parameter value represents CPU utilization or memory utilization for example), and the operational parameter value itself 1118. A time stamp 1119 identifying the time at which the data was obtained is included as well.

The time series 1120 of logging data includes logging data generated by one or more network devices and/or components of those devices (e.g., any one or more of the device illustrate din FIG. 6B for example. Each of the devices or device types generates, in some embodiments, different types of log information. For example, a first component generates, in some embodiments, latency measurements as log data, while another second component generates, in some embodiments, CPU utilization measurements as log data. The time series 1120 of logging data of FIG. 11 is intended to represent a plurality of log data time series from a corresponding plurality of device/component combinations. An example individual data entry in the time series 1120 of logging data is shown to include a device identifier 1122, component identifier 1124, and log data 1126. A time stamp 1128 identifying the time at which the log data was logged is included as well.

FIG. 11 also shows labels/annotation information 1035 of FIG. 10. As shown in FIG. 11, in some embodiments, the labels/annotation information 1035 include a time series 1130 of root cause indications and/or a time series 1140 of log data level settings recommendations. FIG. 11 shows an example of contents of each entry in a time series of root cause indicators. FIG. 11 shows a root cause indicator includes, in some embodiments, a device identifier 1132, component identifier 1134, cause identifier 1136, a probability 1137 that the indicated cause is a actual cause of a degradation, and a time 1138. The time 1138 provides for collations between the cause identifier 1136, probability 1137, and data included in other time series, such as the time series 1110 and/or time series 1120.

FIG. 11 shows one embodiment of an entry in the time series 1140 of log data level settings recommendations includes a device identifier 1142, component identifier 1144, log data level recommendation 1146, and a time 1148. Some embodiments associate entries in each of the time series 1110, 1120, 1130, and 1140 via their respective time fields 1119, 1128, 1138, and 1148. Thus, a machine learning model forms associations between these entries based on the time fields when training, and is then able to rely on those associations or time correlations when generating appropriate root cause indications and/or log data level setting recommendations.

Figure 12:
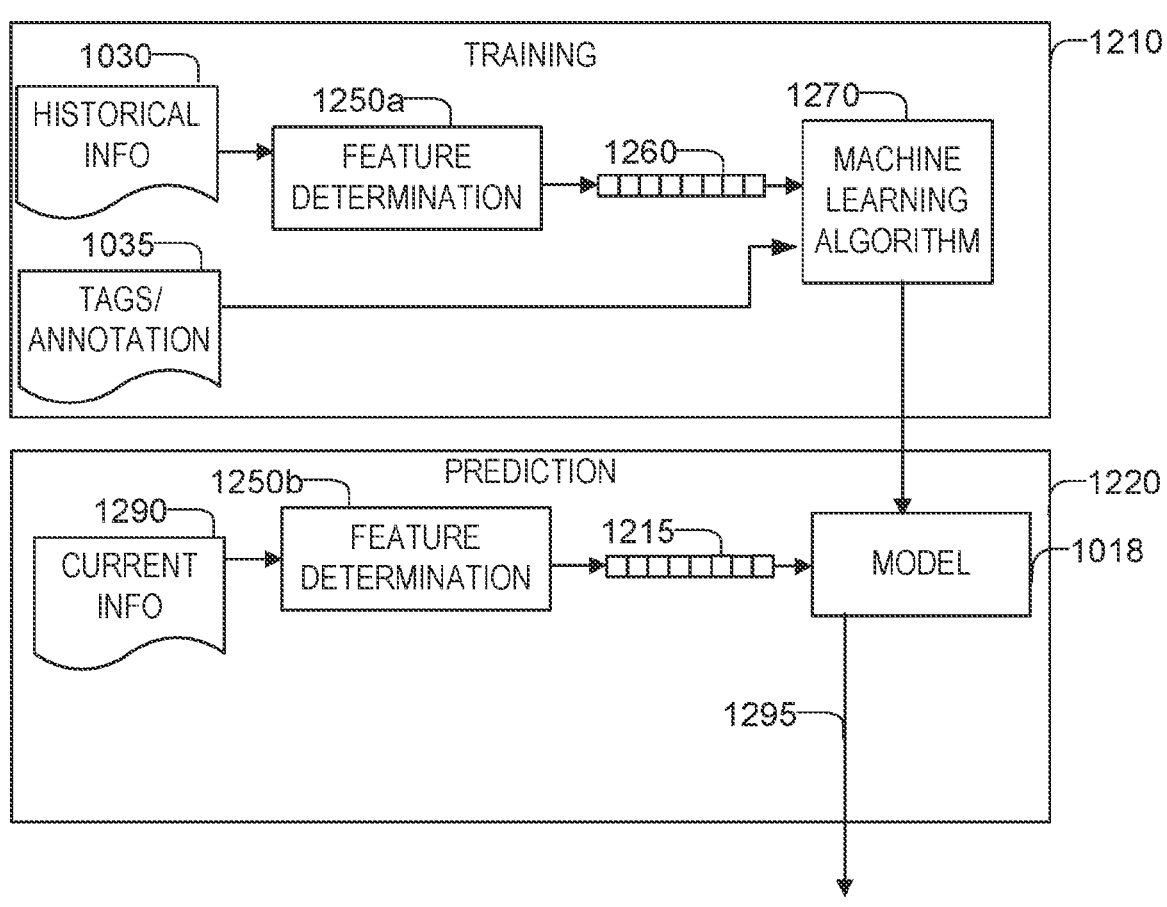
FIG. 12 shows an example machine learning module according to some examples of the present disclosure.

FIG. 12 shows an example machine learning module 1200 according to some examples of the present disclosure. Example machine learning module 1200 utilizes a training module 1210 and a prediction module 1220. Training module 1210 uses historical information 1030 as input into feature determination module 1250*a*. The historical information 1030 is labeled in at least some embodiments. As discussed above with respect to FIG. 11, example historical information 1030 includes, in some embodiments, historical operational parameter values discussed above, such as but not limited to CPU utilization, memory utilization, latency measurements, error counts, collision metrics, or throughput measurements.

The historical information 1030 also includes, in some embodiments, one or more indications of logging data generated by network devices and/or components of those devices, with the network devices being included in a system being monitored.

Labels/annotation information 1035 includes, in some embodiments, possible root causes associated with corresponding operational parameter values and/or logging data (included in the historical information 1030).

Feature determination module 1250*a* determines one or more features from this historical information 1030. Stated generally, features are a set of the information input and is information determined to be predictive of a particular outcome. In some examples, the features include the historical activity data, but in other examples, the features are, in some embodiments, a subset of the historical activity data. In some embodiments, the features are encoded into a feature vector 1260. In some embodiments, feature determination module 1250*a* utilizes one or more heuristics when processing the historical information 1030 to determine features in feature vector 1260. The machine learning algorithm 1270 produces a machine learning model 1018 based upon the feature vector 1260 and the labels/annotation information 1035.

In the prediction module 1220, current information 1290 is used as input to the feature determination module 1250*b*. The current information 1290 in the disclosed embodiments, include similar indications of that described above with respect to the historical information 1030. However, the current information 1290 provides these indications for contemporaneous logging activity or operational parameter values of a monitored system. For example, contemporaneous activity of a monitored system is provided to the feature determination module 1250*b* to determine, in some embodiments, whether the monitored system is experiencing an operational problem and if so, what the most likely root cause is. The current information 1290 also allows the machine learning model 1018 to generate recommendations for log data level settings so as to potential increase a probability associated with one or more root cause determinations.

Feature determination module 1250*b* determines the same set of features or a different set of features from the current information 1290 as feature determination module 1250*a* determined from historical information 1030. In some examples, feature determination modules 1250*a* and 1250*b* are the same module. Feature determination module 1250*b* produces feature vector 1215. In some embodiments, feature determination module 1250*b* utilizes one or more heuristics when processing the current information 1290 to determine features in feature vector 1215. Feature vector 1215 is then provided as input to the machine learning model 1018 to generate an output 1295. An example of an output 1295 is discussed above with respect to FIG. 10. For example, the output 1295 can include log data level recommendations, such as those including one or more of a device identifier 1052, component identifier 1054, and/or log data level 1056. The output 1295 includes, in some embodiments, one or more indications of a root cause, such as the cause indicator 1062 and/or an associated probability 1064. The training module 1210 operates, in some embodiments, in an offline manner to train the machine learning model 1018. The prediction module 1220, however, is also designed, in some embodiments, to operate in an online manner. The machine learning model 1018 is periodically updated, in at least some embodiments, via additional training and/or user feedback.

The machine learning algorithm 1270 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 1210. In an example embodiment, a regression model is used and the machine learning model 1018 is a vector of coefficients corresponding to a learned importance for each of the features (or combination of features) in the feature vector 1260, and feature vector 1215. In some embodiments, to calculate a score, a dot product of the feature vector 1215 and the vector of coefficients of the machine learning model 1018 is taken.

Figure 13:
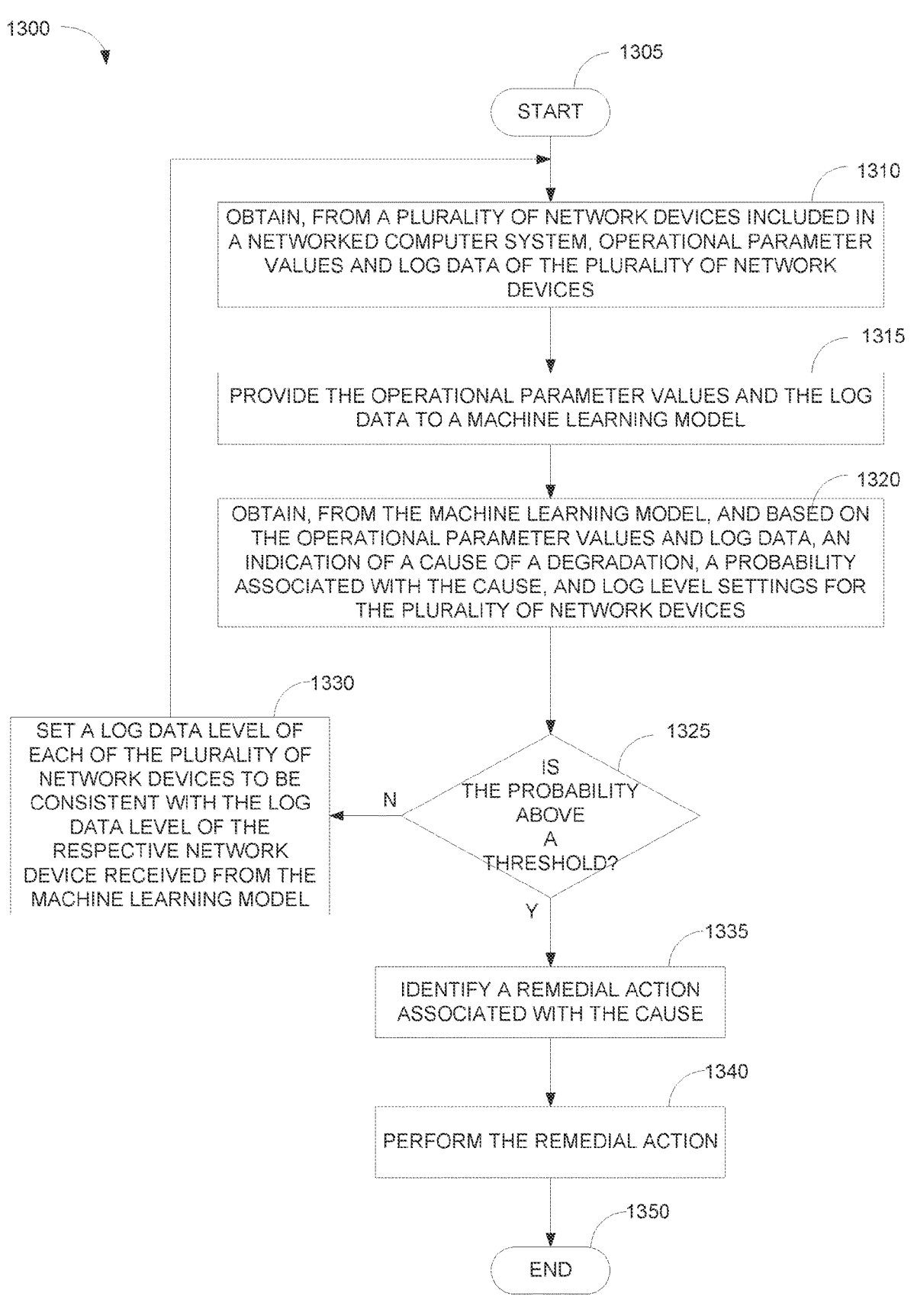
FIG. 13 is a flowchart of an example method of modifying a log data level of one or more components or devices.

FIG. 13 is a flowchart of an example method of modifying a log data level of one or more components or devices. In some embodiments, one or more of the functions discussed below with respect to FIG. 13 and the method 1300 is performed by hardware processing circuitry. For example, one or more hardware memories (e.g. memory 212, memory 312, memory 412, memory 512) store instructions (e.g., routines 228, routines 328, routines 428, routines 528) that when executed configure the hardware processing circuitry (e.g. hardware processor 206, hardware processor 306, hardware processor 406, hardware processor 506) to perform the one or more functions of the method 1300 discussed below. In some embodiments, one or more of the functions discussed below with respect to FIG. 13 and method 1300 are performed by a network management system.

After start operation 1305, method 1300 moves to operation 1310. In operation 1310, operational parameter values of a plurality of network devices are obtained. For example, in some embodiments, the operational parameter values are obtained from one or more devices analogous to any one or more of the devices illustrated in FIG. 6B. As discussed above, the operational parameter values are indicative of operation of the devices and/or the computer system as a whole. Example operational parameters include CPU utilization, memory utilization, I/O utilization, number of running tasks, a latency measurement, a throughput measurement, a jitter measurement, a mobility measurement, a signal strength measurement (e.g., a received signal strength indication (RSSI)), an error count (e.g. a dropped packets count), a number of packets transmitted and/or received within a time period, or other parameters. Operation 1310 also obtains log data from the plurality of network devices. Log data is generated by each of the network devices based on a current log data level setting of the respective device. For example, in some embodiments, a verbosity (or an amount) of log data generated by a device increases as a log data level setting of the device increases. In various embodiments, the log data includes, for example, execution trace data of a device and/or component of the device (e.g. data indicating methods invoked, input and/or output parameters of the invoked methods, data indicating input to a device or component, input indicating output of a device or component Operation 1315 provides the operational parameter values and the log data to a machine learning model. For example, as described above with respect to FIGS. 10-11, some embodiments implement a machine learning model (e.g. machine learning model 1018) that receives a time series of operational parameter values (e.g. the time series 1110 of operational parameter values) and/or a time series of log data (e.g. time series 1120 of logging data).

In operation 1320, an indication of a cause of degradation and a probability associated with the cause are determined. For example, as discussed above with respect to FIG. 10, some embodiments implement a machine learning model that provides one or more pairs of cause indications (e.g., cause indicator 1062), and an associated probability (e.g., probability 1064). The machine learning model also provides indications of recommended log data levels. For example, as illustrated in FIG. 10, some embodiments of the machine learning model indicate a log data level (e.g. log data level 1056) for a device (e.g. via device identifier 1052) and/or a component of the device (e.g. component identifier 1054). Some embodiments of method 1300 implement a machine learning model that returns a plurality of cause/probability pairs. Some embodiments then rank the cause/probability pairs from highest probability to lowest. These highest ranked pairs are then evaluated further by method 1300 as described below.

Decision operation 1325 determines if the probability of the cause (received in operation 1320) is above a predefined threshold. The probability associated with a cause indicates, in some embodiments, a confidence level that the system being analyzed by the machine learning model has a degradation that results from the indicated cause. If the probability is sufficiently high (e.g. above a predefined threshold), method 1300 moves from decision operation 1325 to operation 1335. If the probability is not sufficiently high (e.g. does not meet a criterion that tests for whether the probably is sufficiently high, e.g. compares the probability to a predefined probability threshold), then method 1300 moves from decision operation 1325 to operation 1330

In operation 1330, log data level settings of the plurality of network devices are modified so as to be consistent with the log data level settings recommended or otherwise provided by the machine learning model. For example, some devices implement an application programming interface that enables a network management system to modify the device's log data level settings, and is thus able to change an amount or verbosity of log data generated by the device. An example of a change in verbosity includes in some embodiments, a first level of logging providing tracing of method invocations and exits as log data and a second level of logging providing addition tracing of in-method execution (e.g. branching inside a method) as log data. Another example of a difference in log data level, in some embodiments, is a device and/or device component generating operational parameter values of a first set of variables as log data at a given first log data level setting, and generating operational parameter values of a second set of variables as log data at a given second log data level setting, with the second set of variables including the first set of variables, but also including at least one additional variable not included in the first set of variables. This pattern might be replicated for three, four, five, or more log data levels (e.g. with progressive log data levels adding logging for at least one additional variable relative to a lower level of logging.

After the log data level settings are modified, method 1300 moves from operation 1330 back to operation 1310. Note that upon a subsequent performance of operation 1310, the obtained log data is based on the log data levels that are modified in the previous performance of operation 1330.

If the probability of a cause generated by the machine learning model is sufficiently high (e.g. meets a criterion), operation 1335 identifies a remedial action based on the cause. Some embodiments maintain mappings between causes and remedial actions. Thus, some embodiments of operation 1335 rely on the mapping to identify the remedial action based on the cause. In some embodiments, mappings of multiple causes identified by the machine learning model are mapped to remedial actions. Thus, in these embodiments, if the machine learning model identifies a first pair of causes, each cause with sufficiently high associated probability, a mapping identifies a first remedial action. If the machine learning model identifies a second pair of causes, each cause with sufficiently high associated probability, the mapping identifies a second remedial action. The first pair of causes and second pair of causes have, in some instances, one cause in common. The mapping still identifies two different remedial actions for the two pairs, at least in some embodiments.

In operation 1340, the remedial action is performed. Examples of remedial actions include resetting or restarting a particular device of the plurality of network devices, changing a parameter value of one or more of the network devices (e.g., changing a memory allocation for network buffer space, transient swap space, or other configuration settings), or getting an alert (e.g. via any messaging technology such as email, text, voice, or other messaging technology).

After operation 1340 completes, method 1300 moves to end operation 1350.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are examples. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one example aspect.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The example embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the example embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the example embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

Some example embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

Example 1 is a method performed by hardware processing circuitry, comprising: obtaining, from a plurality of network devices included in a networked computer system, for each of the plurality of network devices, one or more operational parameter values and first log data of the plurality of network devices; providing the operational parameter values and the first log data to a machine learning model system; obtaining, from the machine learning model system, and based on the providing of the operational parameter values and the log data, a recommended log data level of each of the plurality of network devices; setting a log data level of each of the plurality of network devices based on the recommended log data level for the respective network device; obtaining, from each of the plurality of network devices, second log data based on the set log data level of the respective network device; providing, to the machine learning model system, the second log data; obtaining, from the machine learning model system, and based on the second log data, an indication of a cause of a degradation of the networked computer system identifying a remedial action based on the cause; and applying the remedial action to the networked computer system.

In Example 2, the subject matter of Example 1 optionally includes obtaining, from the machine learning model system, a probability associated with the indicated cause, and identifying the remedial action based on the probability.

In Example 3, the subject matter of any one or more of Examples 1-2 optionally include wherein the one or more operational parameter values indicate one or more of a processor utilization, a memory utilization, a throughput measurement, a latency measurement, a jitter measurement, a mobility measurement, a signal strength measurement, or an error count.

In Example 4, the subject matter of any one or more of Examples 1-3 optionally include wherein the machine learning model system operates using a machine learning model that is trained via time correlated operational parameter values, log data levels, root cause indicators, or probabilities.

In Example 5, the subject matter of any one or more of Examples 1-4 optionally include wherein the plurality of network devices includes at least one access point and at least one wireless terminal associated with the access point.

In Example 6, the subject matter of any one or more of Examples 1-5 optionally include providing, to the machine learning model system, log rate data defining a rate of data generated by each of the plurality of network devices at different log data levels, wherein the obtaining, from the machine learning model system, of the recommended log data level of each of the plurality of network devices is further based on the log rate data.

In Example 7, the subject matter of any one or more of Examples 1-6 optionally include providing, to the machine learning model system, a mapping between different log data levels and operational parameter sets includes in log data at each of the different log data levels, wherein the obtaining, from the machine learning model system, of the recommended log data level of each of the plurality of network devices is further based on the mapping.

Example 8 is a system, comprising: hardware processing circuitry; one or more memories storing instructions that when executed configure hardware processing circuitry to perform operations comprising: obtaining, from a plurality of network devices included in a networked computer system, for each of the plurality of network devices, one or more operational parameter values and first log data of the plurality of network devices; providing the operational parameter values and the first log data to a machine learning model system; obtaining, from the machine learning model system, and based on the providing of the operational parameter values and the log data, a recommended log data level of each of the plurality of network devices; setting a log data level of each of the plurality of network devices based on the recommended log data level for the respective network device; obtaining, from each of the plurality of network devices, second log data based on the set log data level of the respective network device; providing, to the machine learning model system, the second log data; obtaining, from the machine learning model system, and based on the second log data, an indication of a cause of a degradation of the networked computer system identifying a remedial action based on the cause; and applying the remedial action to the networked computer system.

In Example 9, the subject matter of Example 8 optionally includes the operations further comprising obtaining, from the machine learning model system, a probability associated with the indicated cause, and identifying the remedial action based on the probability.

In Example 10, the subject matter of any one or more of Examples 8-9 optionally include wherein the one or more operational parameter values indicate one or more of a processor utilization, a memory utilization, a throughput measurement, a latency measurement, a jitter measurement, a mobility measurement, a signal strength measurement, or an error count.

In Example 11, the subject matter of any one or more of Examples 8-10 optionally include wherein the machine learning model system operates using a machine learning model that is trained via time correlated operational parameter values, log data levels, root cause indicators, or probabilities.

In Example 12, the subject matter of any one or more of Examples 8-11 optionally include wherein the plurality of network devices includes at least one access point and at least one wireless terminal associated with the access point.

In Example 13, the subject matter of any one or more of Examples 8-12 optionally include the operations further comprising providing, to the machine learning model system, log rate data defining a rate of data generated by each of the plurality of network devices at different log data levels, wherein the obtaining, from the machine learning model system, of the recommended log data level of each of the plurality of network devices is further based on the log rate data.

In Example 14, the subject matter of any one or more of Examples 8-13 optionally include the operations further comprising providing, to the machine learning model system, a mapping between different log data levels and operational parameter sets includes in log data at each of the different log data levels, wherein the obtaining, from the machine learning model system, of the recommended log data level of each of the plurality of network devices is further based on the mapping.

In Example 15, the subject matter of any one or more of Examples 8-14 optionally include the operations further comprising providing, the machine learning model system, data defining an amount of log data generated by each of the plurality of network devices at different log data levels, wherein the obtaining, from the machine learning model system, the recommended log data level of each of the plurality of network devices is further based on the data.

In Example 16, the subject matter of any one or more of Examples 8-15 optionally include wherein the setting of the log data level is in response to a determination that a probability associated with a cause identified by the machine learning model system is below a predefined threshold.

In Example 17, the subject matter of any one or more of Examples 9-16 optionally include wherein the identification of the remedial action is in response to the probability being above a predefined threshold.

Example 18 is a non-transitory computer readable storage medium comprising instructions that when executed configure hardware processing circuitry to perform operations comprising: obtaining, from a plurality of network devices included in a networked computer system, for each of the plurality of network devices, one or more operational parameter values and first log data of the plurality of network devices; providing the operational parameter values and the first log data to a machine learning model system; obtaining, from the machine learning model system, and based on the providing of the operational parameter values and the log data, a recommended log data level of each of the plurality of network devices; setting a log data level of each of the plurality of network devices based on the recommended log data level for the respective network device; obtaining, from each of the plurality of network devices, second log data based on the set log data level of the respective network device; providing, to the machine learning model system, the second log data; obtaining, from the machine learning model system, and based on the second log data, an indication of a cause of a degradation of the networked computer system identifying a remedial action based on the cause; and applying the remedial action to the networked computer system.

In Example 19, the subject matter of Example 18 optionally includes the operations further comprising obtaining, from the machine learning model system, a probability associated with the indicated cause, and identifying the remedial action based on the probability.

In Example 20, the subject matter of any one or more of Examples 18-19 optionally include wherein the one or more operational parameter values indicate one or more of a processor utilization, a memory utilization, a throughput measurement, a latency measurement, a jitter measurement, a mobility measurement, a signal strength measurement, or an error count.

In Example 21, the subject matter of any one or more of Examples 18-20 optionally include wherein the machine learning model system operates using a machine learning model that is trained via time correlated operational parameter values, log data levels, root cause indicators, or probabilities.

In Example 22, the subject matter of any one or more of Examples 18-21 optionally include wherein the plurality of network devices includes at least one access point and at least one wireless terminal associated with the access point.

In Example 23, the subject matter of any one or more of Examples 18-22 optionally include the operations further comprising providing, to the machine learning model system, log rate data defining a rate of data generated by each of the plurality of network devices at different log data levels, wherein the obtaining, from the machine learning model system, of the recommended log data level of each of the plurality of network devices is further based on the log rate data.

In Example 24, the subject matter of any one or more of Examples 18-23 optionally include the operations further comprising providing, to the machine learning model system, a mapping between different log data levels and operational parameter sets includes in log data at each of the different log data levels, wherein the obtaining, from the machine learning model system, of the recommended log data level of each of the plurality of network devices is further based on the mapping.

In Example 25, the subject matter of any one or more of Examples 18-24 optionally include the operations further comprising providing, the machine learning model system, data defining an amount of log data generated by each of the plurality of network devices at different log data levels, wherein the obtaining, from the machine learning model system, the recommended log data level of each of the plurality of network devices is further based on the data.

In Example 26, the subject matter of any one or more of Examples 18-25 optionally include wherein the setting of the log data level is in response to a determination that a probability associated with a cause identified by the machine learning model system is below a predefined threshold.

In Example 27, the subject matter of any one or more of Examples 19-26 optionally include wherein the identification of the remedial action is in response to the probability being above a predefined threshold.

In Example 28, the subject matter of any one or more of Examples 1-27 optionally include providing, the machine learning model system, data defining an amount of log data generated by each of the plurality of network devices at different log data levels, wherein the obtaining, from the machine learning model system, the recommended log data level of each of the plurality of network devices is further based on the data.

In Example 29, the subject matter of any one or more of Examples 1-28 optionally include wherein the setting of the log data level is in response to a determination that a probability associated with a cause identified by the machine learning model system is below a predefined threshold.

In Example 30, the subject matter of any one or more of Examples 2-29 optionally include wherein the identification of the remedial action is in response to the probability being above a predefined threshold.

Some example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the embodiment(s). Additionally, the example techniques illustrated herein are not limited to the specifically illustrated embodiments but can also be utilized with the other example embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method comprising:
obtaining, by a network management system, operational parameter values and log data associated with a plurality of network devices in a networked computer system;
determining, by the network management system and based on the operational parameter values, a probability associated with an indicated cause of anomalous operation of the networked computer system;
based on determining that the probability associated with the indicated cause of anomalous operation of the networked computer system is below a threshold, determining, by the network management system and based on the log data, a recommended log data level for at least one network device of the plurality of network devices, wherein the recommended log data level indicates a rate or a total amount of data to collect; and
communicating, by the network management system, an instruction for the at least one network device to modify an associated log data level based on the recommended log data level for the at least one network device.

2. The method of claim 1, further comprising:
obtaining second log data associated with the plurality of network devices, wherein the second log data associated with the at least one network device is based on the recommended log data level for the at least one network device.

3. The method of claim 2, further comprising:
determining, based on the second log data, an indication of a cause of anomalous operation of the networked computer system;
identifying a remedial action based on the cause; and
applying the remedial action to the networked computer system.

4. The method of claim 3, further comprising determining a probability associated with the indicated cause, and identifying the remedial action based on the probability.

5. The method of claim 1, wherein the operational parameter values include one or more of a processor utilization, a memory utilization, a throughput measurement, a latency measurement, a jitter measurement, a mobility measurement, a signal strength measurement, or an error count.

6. The method of claim 1, wherein the plurality of network devices includes at least one access point and at least one wireless terminal associated with the access point.

7. The method of claim 1, wherein communicating the instruction for the at least one network device to modify the associated log data level based on the recommended log data level for the at least one network device includes communicating an instruction for the at least one network device to modify the associated log data level for at least one component of the at least one network device based on the recommended log data level for the at least one network device.

8. The method of claim 1, wherein obtaining the operational parameter values comprises obtaining a first set of operational parameters logged at a first log data level and a second set of operational parameters logged at a second log data level.

9. The method of claim 8, wherein the second set of operational parameters includes the first set of parameters and at least one additional operational parameter that is not included in the first set of operational parameters.

10. The method of claim 1, wherein determining, based on the operational parameter values and the log data, the recommended log data level for the at least one network device includes determining, using a trained machine learning model and based on the operational parameter values and the log data, the recommended log data level for the at least one network device.

11. A network management system, comprising:
hardware processing circuitry; and
one or more memories storing instructions that when executed configure the hardware processing circuitry to:
obtain operational parameter values and log data associated with a plurality of network devices in a networked computer system;
determine, based on the operational parameter values, a probability associated with an indicated cause of anomalous operation of the networked computer system;
based on determining that the probability associated with the indicated cause of anomalous operation of the networked computer system is below a threshold, determine, based on the log data, a recommended log data level for at least one network device of the plurality of network devices, wherein the recommended log data level indicates a rate or total amount of data to collect; and
communicate an instruction for the at least one network device to modify an associated log data level based on the recommended log data level for the at least one network device.

12. The network management system of claim 11, wherein the instructions further configure the hardware processing circuitry to:
obtain second log data associated with the plurality of network devices, wherein the second log data associated with the at least one network device is based on the recommended log data level for the at least one network device.

13. The network management system of claim 12, wherein the instructions further configure the hardware processing circuitry to:

determine, based on the second log data, an indication of a cause of anomalous operation of the networked computer system;
identify a remedial action based on the cause; and
apply the remedial action to the networked computer system.

14. The network management system of claim 11, wherein the operational parameter values include one or more of a processor utilization, a memory utilization, a throughput measurement, a latency measurement, a jitter measurement, a mobility measurement, a signal strength measurement, or an error count.

15. The network management system of claim 11, wherein the plurality of network devices includes at least one access point and at least one wireless terminal associated with the access point.

16. The network management system of claim 11, wherein to obtain operational parameter values, the instructions further configure the hardware processing circuitry to obtain a first set of operational parameters logged at a first log data level and a second set of operational parameters logged at a second log data level.

17. The network management system of claim 11, wherein to determine, based on the operational parameter values and the log data, a recommended log data level for one or more of the plurality of network devices, the instructions further configure the hardware processing circuitry to determine, using a trained machine learning model and based on the operational parameter values and the log data, the recommended log data level for the at least one network device.

18. Non-transitory computer readable storage media comprising instructions that when executed configure hardware processing circuitry of a network management system to:
obtain operational parameter values and log data associated with a plurality of network devices in a networked computer system;
determine, based on the operational parameter values, a probability associated with an indicated cause of anomalous operation of the networked computer system;
based on determining that the probability associated with the indicated cause of anomalous operation of the networked computer system is below a threshold, determine, based on the log data, a recommended log data level for at least one network device of the plurality of network devices, wherein the recommended log data level indicates a rate or total amount of data to collect; and
communicating an instruction for the at least one network device to modify an associated log data level based on the recommended log data level for the at least one network device.

\* \* \* \* \*